US011857989B2

(12) United States Patent
Guffey et al.

(10) Patent No.: US 11,857,989 B2
(45) Date of Patent: Jan. 2, 2024

(54) SPRAY RACK SYSTEM

(71) Applicant: Guffey Systems, LLC, Seymour, TN (US)

(72) Inventors: Nathan D. Guffey, Seymour, TN (US); Benjamin D. Nibali, Alcoa, TN (US); Lukas R. Bearden, Alcoa, TN (US); Kenny D. Guffey, Seymour, TN (US); Aaron D. Carroll, Alcoa, TN (US)

(73) Assignee: Guffey Systems, LLC, Seymour, TN (US)

( * ) Notice: Subject to any disclaimer, the term of this patent is extended or adjusted under 35 U.S.C. 154(b) by 259 days.

(21) Appl. No.: 17/354,612

(22) Filed: Jun. 22, 2021

(65) Prior Publication Data

US 2022/0008945 A1 Jan. 13, 2022

Related U.S. Application Data

(63) Continuation-in-part of application No. 16/108,731, filed on Aug. 22, 2018, now Pat. No. 11,040,367.

(51) Int. Cl.
*B05B 13/02* (2006.01)

(52) U.S. Cl.
CPC ................................ *B05B 13/0285* (2013.01)

(58) Field of Classification Search
CPC ............ B05B 13/0285; B05B 13/0292; B05B 13/0264; B05C 13/00; B05C 13/02; B25B 11/00; B25H 1/00; B25H 1/0042; B25H 1/10; B25H 1/08; B25H 3/04; Y10S 269/905
See application file for complete search history.

(56) References Cited

U.S. PATENT DOCUMENTS

| | | | | |
|---|---|---|---|---|
| 2,446,887 A * | 8/1948 | Shearer | ................. | E05D 15/063 16/97 |
| 4,239,015 A | 12/1980 | Novello et al. | | |
| 4,838,199 A | 6/1989 | Weber | | |
| 5,568,954 A | 10/1996 | Burgess | | |
| 5,894,945 A | 4/1999 | Curran | | |
| 5,908,120 A * | 6/1999 | Yates | ...................... | B05B 5/082 118/500 |
| 6,197,175 B1 | 3/2001 | Kisi et al. | | |
| 6,669,037 B1 | 12/2003 | Ahn | | |
| 6,673,153 B2 | 1/2004 | Ehrenleitner et al. | | |

(Continued)

*Primary Examiner* — Tyrone V Hall, Jr.
(74) *Attorney, Agent, or Firm* — Pitts Lake, LLC

(57) ABSTRACT

A system for retaining and maneuvering workpiece items to be spray-coated, the system including a workpiece hanger mount including a body portion, two side portions extending downward from the body portion to form an upper open space therebetween, two flange portions extending inwardly respectively from proximate distal ends of the two side portions to form a lower open space therebetween, and a groove formed in an upper surface of each of the flange portions, and one or more workpiece hangers including a lower portion configured to be attached to a workpiece, and an upper portion having two side tabs extending away from one another and configured to be selectively received in the respective grooves formed in the flange portions of the hanger mount, wherein a workpiece is hung from the system by attaching the workpiece to one of the workpiece hangers and mounting the workpiece hanger in the hanger mount.

21 Claims, 20 Drawing Sheets

(56) References Cited

U.S. PATENT DOCUMENTS

| | | | |
|---|---|---|---|
| 6,702,130 | B1 | 3/2004 | Carlilse |
| 7,798,095 | B2 | 9/2010 | Navarro |
| 8,136,475 | B2 | 3/2012 | Davis et al. |
| 8,453,597 | B2 | 6/2013 | Ansorge et al. |

* cited by examiner

SPRAY RACK SYSTEM

CROSS-REFERENCE TO RELATED APPLICATIONS

This application is a continuation-in-part of U.S. patent application Ser. No. 16/108,731, filed Aug. 22, 2018, the contents of which are incorporated herein by reference in their entirety.

FIELD OF INVENTIVE CONCEPT

The present general inventive concept relates to systems and methods of retaining and maneuvering cabinetry, wood products or other items for purposes of applying or spraying coating materials to surfaces of such items.

BACKGROUND

Known systems and apparatuses for spraying, painting, or coating cabinetry, wood products or other items to be surface finished, have been less than satisfactory in facilitating quick and easy handling, processing, and maneuvering of such items. Improvement is desired in the handling, maneuvering, and support of such items to increase efficiency, throughput, and quality of the spraying, painting, and/or coating process.

BRIEF SUMMARY

Example embodiments of the present general inventive concept provide a system for retaining and maneuvering wood products, cabinetry items, or other items to be spray-coated, including a rack having a horizontal rail to hang one or more of the items, one or more car members coupled to the horizontal rail such that the one or more car members move along a length of the horizontal rail, and one or more attachment devices removably attachable to the one or more car members and to the one or more items.

Example embodiments of the present general inventive concept also provide a system for retaining and maneuvering items to be spray-coated, including one or more movable racks each having a first horizontal rail to support a plurality of items to be spray-coated and a first channel disposed along a length of the first horizontal rail, one or more car members coupled to the at least one rail such that the one or more car members are configured to move along the first channel of the first horizontal rail and to rotate in multiple distinct positions about an axis perpendicular to the length of the first horizontal rail, one or more attachment devices removably attachable to the one or more car members and the one or more items to be spray coated, respectively, such that the one or more items to be spray-coated hang from the first horizontal rail when the one or more car members are coupled to the first horizontal rail and the attachment devices are respectively attached to the one or more car members and items to be spray coated, a movable base configured to support the first horizontal rail, and one or more fixed racks each having a second horizontal rail and a second channel disposed along a length of the second horizontal rail, the second channel being configured to mate with the first channel to facilitate movement of one or more of the car members between the first channel and the second channel.

Example embodiments of the present general inventive concept also provide a system for retaining and maneuvering workpiece items to be spray-coated, the system including a workpiece hanger mount including a body portion, two side portions extending downward from the body portion to form an upper open space therebetween, two flange portions extending inwardly respectively from proximate distal ends of the two side portions to form a lower open space therebetween, and a groove formed in an upper surface of each of the flange portions, and one or more workpiece hangers including a lower portion configured to be attached to a workpiece, and an upper portion having two side tabs extending away from one another and configured to be selectively received in the respective grooves formed in the flange portions of the hanger mount, wherein a workpiece is selectively hung from the system by attaching the workpiece to one of the workpiece hangers and mounting the workpiece hanger in the hanger mount.

Example embodiments of the present general inventive concept also provide a system for retaining and maneuvering workpiece items to be spray-coated, the system including a workpiece hanger mount including a body portion configured with at least one groove portion, and one or more workpiece hangers including a lower portion configured to be attached to a workpiece, and an upper portion having at least one tab member configured to be selectively received in the at least one groove portion of the hanger mount, wherein a workpiece is selectively hung from the system by attaching the workpiece to one of the workpiece hangers and mounting the workpiece hanger in the hanger mount, and wherein the at least one tab member of the one or more workpiece hangers is configured to fit matingly within the at least one groove portion of the workpiece hanger mount.

Example embodiments of the present general inventive concept also provide a system for retaining and maneuvering workpiece items to be spray-coated, the system including a workpiece hanger mount including a body portion configured with at least one groove portion having at least a first mating surface, and one or more workpiece hangers including a lower portion configured to be attached to a workpiece, and an upper portion having at least one tab member configured to be selectively received in the at least one groove portion of the hanger mount, the at least one tab member having at least a second mating surface such that when a workpiece is attached to the lower portion of the one or more workpiece hangers and the at least one tab member is received in the at least one groove portion, the at least one first and second mating surfaces mate with one another to securely hold the workpiece proximate a center of gravity of the workpiece so as to inhibit lateral movement of the workpiece relative to the workpiece hanger mount.

Other features and aspects may be apparent from the following detailed description, the drawings, and the claims.

BRIEF DESCRIPTION OF THE FIGURES

The following example embodiments are representative of exemplary techniques and structures designed to carry out the objectives of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the exemplary embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Although example embodiments the present general inventive concept will be particularly described as being applied to a system for applying coatings to cabinets or wood products, it will be appreciated that the present general inventive concept can be applied to a variety of other objects, for example furniture, windows, models, and can be made of materials other than wood.

Figure 1:
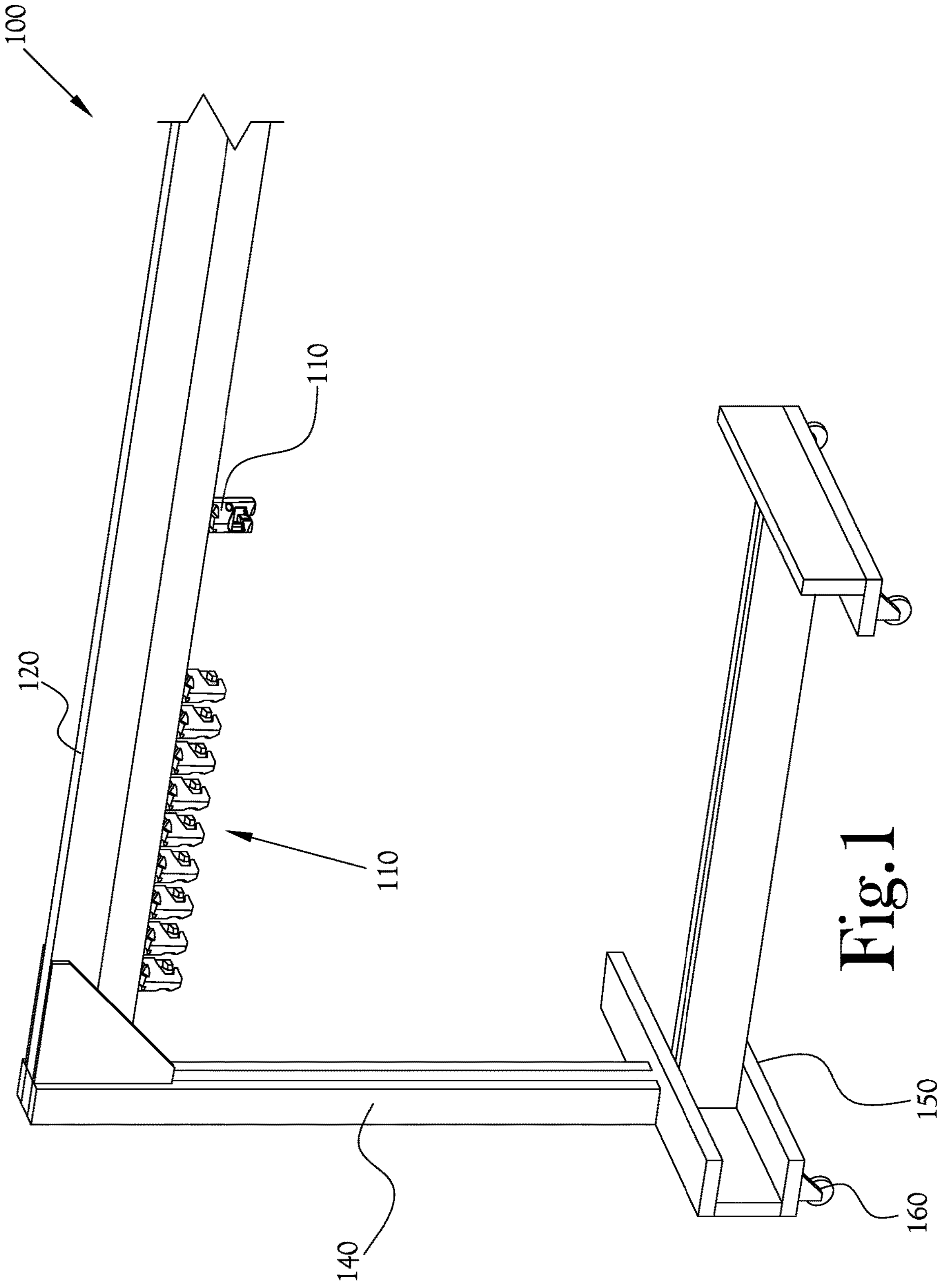
FIG. 1 is a perspective view of a spray rack system according to an example embodiment of the present general inventive concept.

Referring to FIG. 1, example embodiments of the present general inventive concept can be implemented in connection with a rack system for holding multiple movable car members for suspending cabinetry items, which for the purposes of the invention may also include, but is not limited to, other items such as doors or windows. As illustrated in the example embodiment of FIG. 1, a cantilevered rack 100 is shown with multiple slideable, car members 110 attached to its horizontal rail 120. Although FIG. 1 shows 10 car members 110, any number of car members 110 may be utilized subject to the size constraints of the horizontal rail 120. The horizontal rail 120, as shown, may have a rail coupling (described below) so that it can be configured to join securely with other racks 100. A vertical arm 140 is shown which may support the weight of the horizontal rail 120 along with any items being held. The vertical arm 140 is shown attached to a cart 150 with rotatable cart wheels 160. The horizontal rail 120, vertical arm 140, and cart 150 may be constructed of a material strong enough to be able to support the weight of the cabinets, fairly rigid to avoid against undue flex, light weight for easy transportation, and not overly expensive. Two examples of such material are aluminum and steel, although other materials are also possible. Although the cart 150 is shown in FIG. 1 as 2 joists spanned by a cross beam, it is also possible to carry out embodiments of the present general inventive concept using other systems which are configured for supporting and moving the rack. All such configurations and modifications are intended to be included within the scope and spirit of the present general inventive concept.

Figure 2:
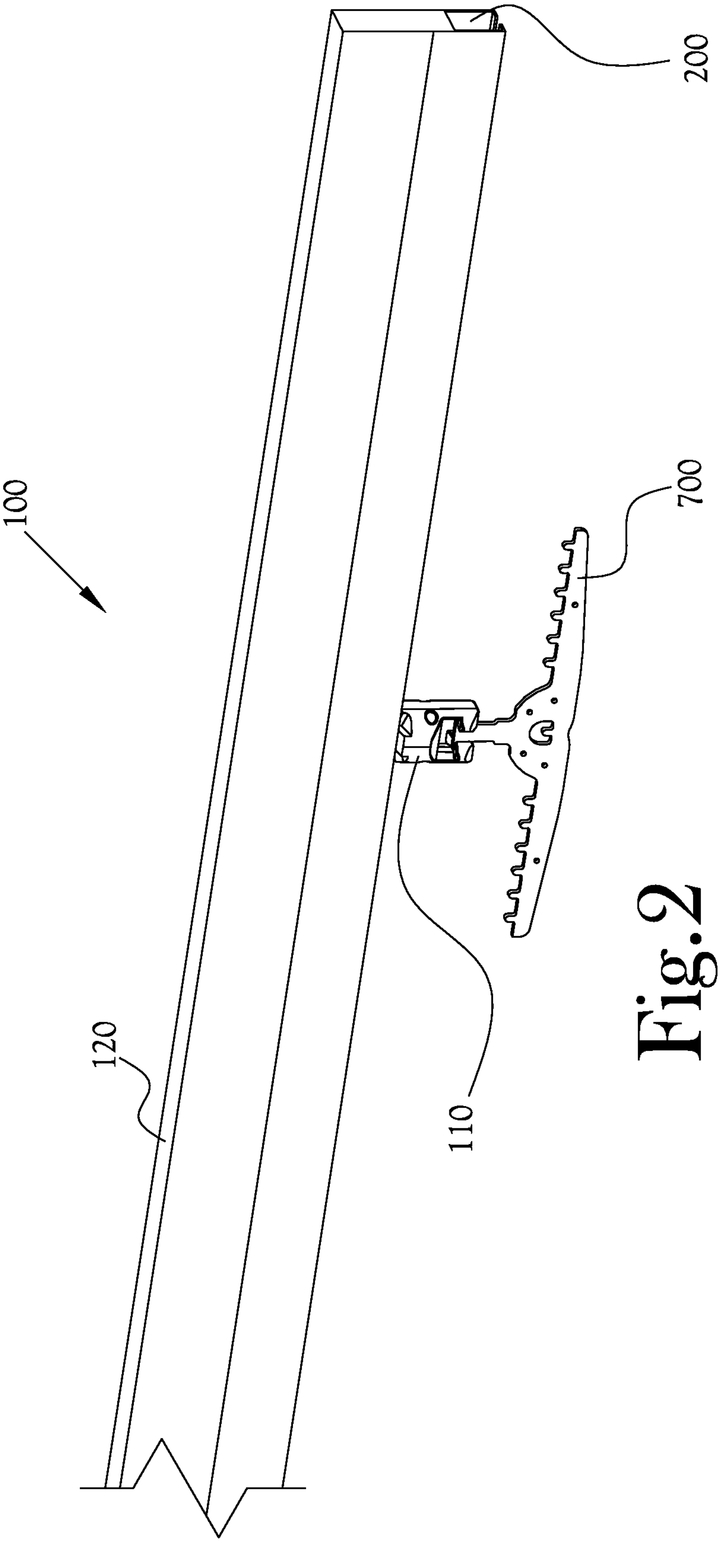
FIG. 2 is a close-up view of a horizontal rail of a spray rack system, according to an example embodiment of the present general inventive concept.

FIG. 2 is a close-up view of the horizontal rail 120 with one of the car members 110 shown attached to the horizontal rail 120. Multiple attachment devices (shown in subsequent figures) can be specialized for cabinet components, and are used to suspend cabinet components and other objects from the rack 100. Included amongst these attachment devices may be a drawer front holder 400, a shelf holder 300 and a hanger 700. Further description of these devices will be provided in the description below. Also shown in the close up view of FIG. 2 is a cut out view of the horizontal rail 120, showing the channel 200 within which the car members 110 may be suspended, and within which they may move in a lateral direction. Although not shown in FIG. 2, in an example embodiment, a stop may be placed at the end of the horizontal rail 120 in order to restrain the car members 110 in a lateral direction. Such an embodiment will be described in a subsequent paragraph below.

Figure 3B:
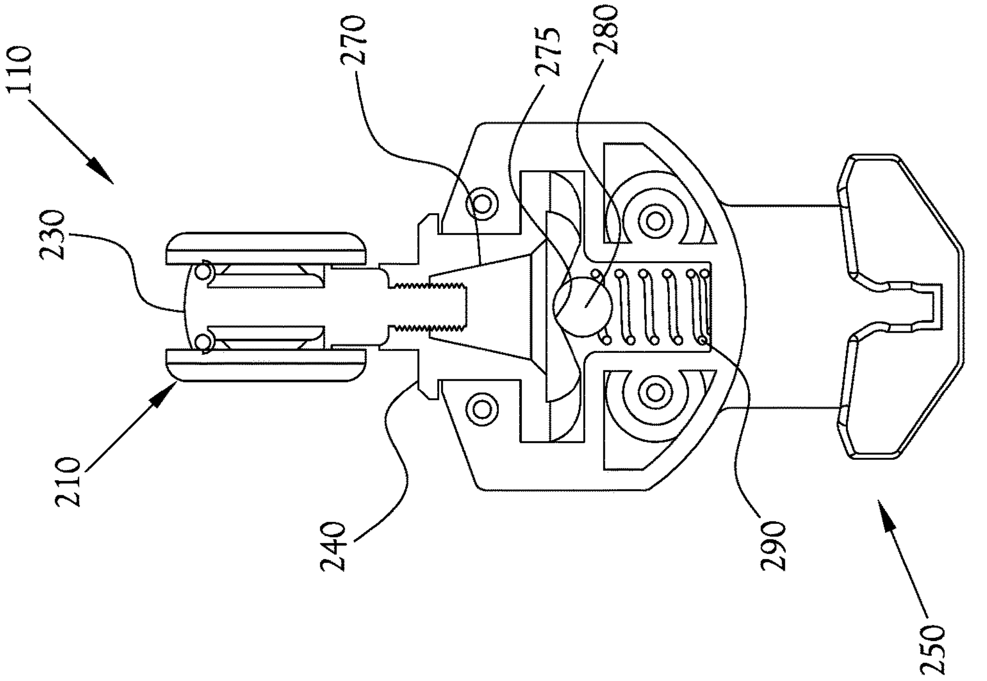
FIG. 3B is a front, internal view of a car member, according to an example embodiment of the present general inventive concept.
Figure 3A:
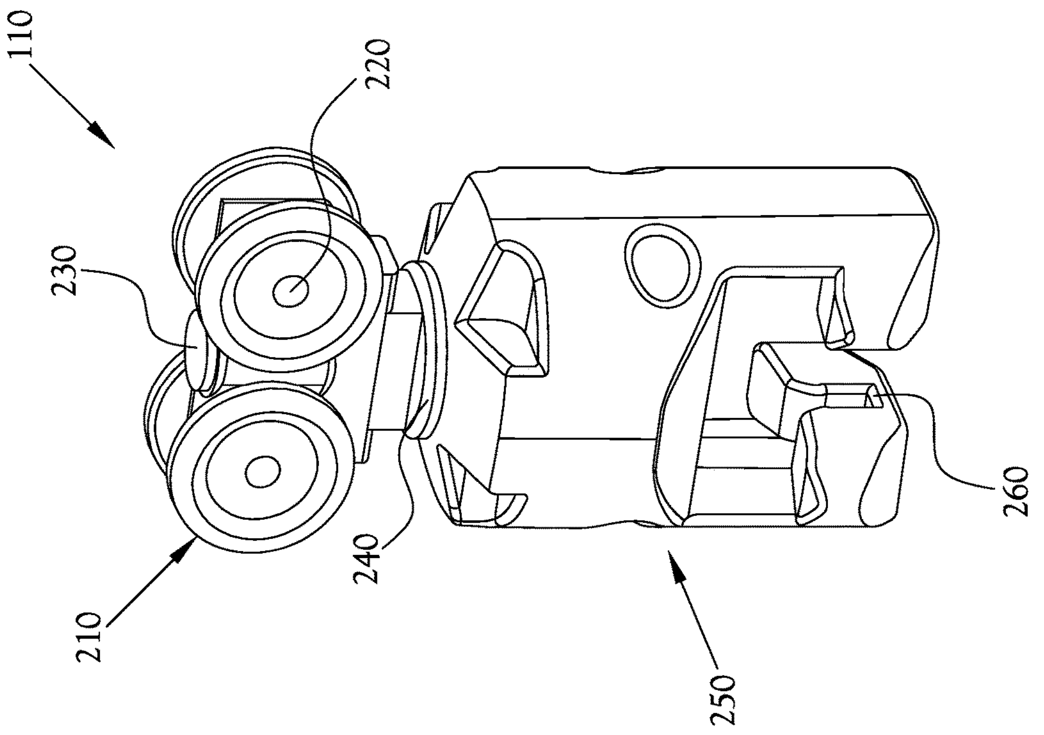
FIG. 3A is a perspective view of a car member, according to an example embodiment of the present general inventive concept.

FIGS. 3A and 3B show different views of the car members 110. FIG. 3A shows a perspective view of a car member 110. The car member wheels 210 are configured to hang and roll within the channel 200 of the horizontal rail 120. It may be useful for the car member wheels 210 to encounter enough resistance within the channel 200 such that the cabinet components do not move under the force of the spray finishing. Additionally, wheel brakes (not shown) may be utilized to resist the movement of the car members 110 and the cabinet components in a lateral direction once a desired position is reached. The car member wheels 210 may be attached to each other with axles 220, and the car member wheels 210 and axles 220 attached to a spindle 230. The car member wheels 210, axles 220 and spindle 230 (or "upper assembly") may be configured to rotate on a platform 240 in relation to the lower assembly 250. In one embodiment of the invention, the lower assembly 250 may rotate in 4 distinct positions relative to the upper assembly, in 90 degree increments, to provide easy access to the cabinet components for finishing and also to resist movement in a circumferential direction. However, it also possible in other embodiments to have more or less than 4 distinct positions subject to physical size constraints. In addition to the rotation as described herein, the car members 110 may also pivot in relation to the horizontal plane, in order to limit the amount of running paint or other finish and to allow proper drying, for example. Additionally, the car members 110 may include a spring system to enable staggered height of adjacent cabinet components or doors. Also shown in FIG. 3 are the lower grooves 260, which may be configured to accept the multiple attachment devices, and which may include the drawer front holder 400, the shelf holder 300, and the hanger 700. A foam pad may also be provided for use with the rack system 100 to pad between cabinet components after they have dried, and the foam pad may be attached to the car members 110 as by a magnet, hook or other attachment structure.

FIG. 3B shows an internal view of a car member 110 including one embodiment of a mechanism for providing the distinct positions of rotation between the lower assembly 250 and the upper assembly. The upper assembly including the spindle 230 are shown attached to a hat 270 with multiple detents 275 cut into the brim of the hat 270. The detents 275 may be spaced in a circumferential direction around the brim of the hat 270 and correspond with the distinct rotation positions of the lower assembly 250 relative to the upper assembly. A pin 280 may rest matingly within the detents 275 of the hat 270. A spring 290 may be in physical contact with the pin 280, and the spring force may bias the pin 280 in an upward direction. Rotation of the upper assembly including the spindle 230 in either a clockwise or counterclockwise direction rotates the hat 270, applies a downward force on the spring and moves the pin 280 out of the detent 275 of the hat 270 within which it was resting, until the pin 280 finds an adjacent detent within which it can rest. Although there may be any number of detents 275 cut into the brim of the hat 270 subject to the physical size constraints of the hat 270, pin 280, and detent 275, in one embodiment the detents 275 are spaced in equal increments apart such that they provide equal access to surface features of the cabinet components.

Figure 3C:
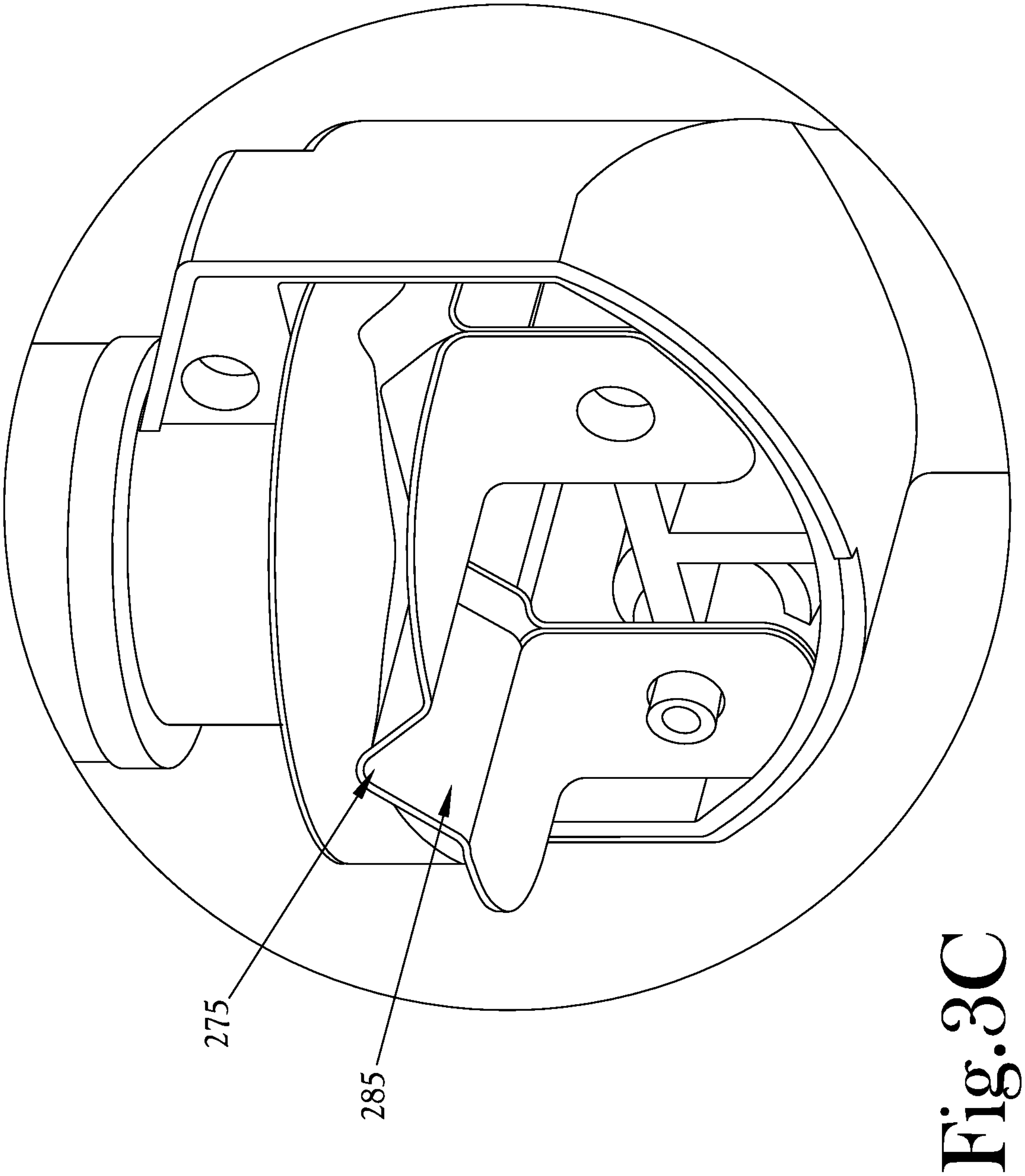
FIG. 3C is a perspective view of a car member, according to an example embodiment of the present general inventive concept.

FIG. 3C shows an alternative embodiment of the car member 110 including one embodiment of a mechanism for providing the distinct positions of rotation between the lower assembly 250 and the upper assembly. In this embodiment, internal spring plates 285 rest matingly within the detents 275 of the hat 270, while intermediate positions between the detents 275 deflect the internal spring plates 285 in a downward direction.

Figure 4:
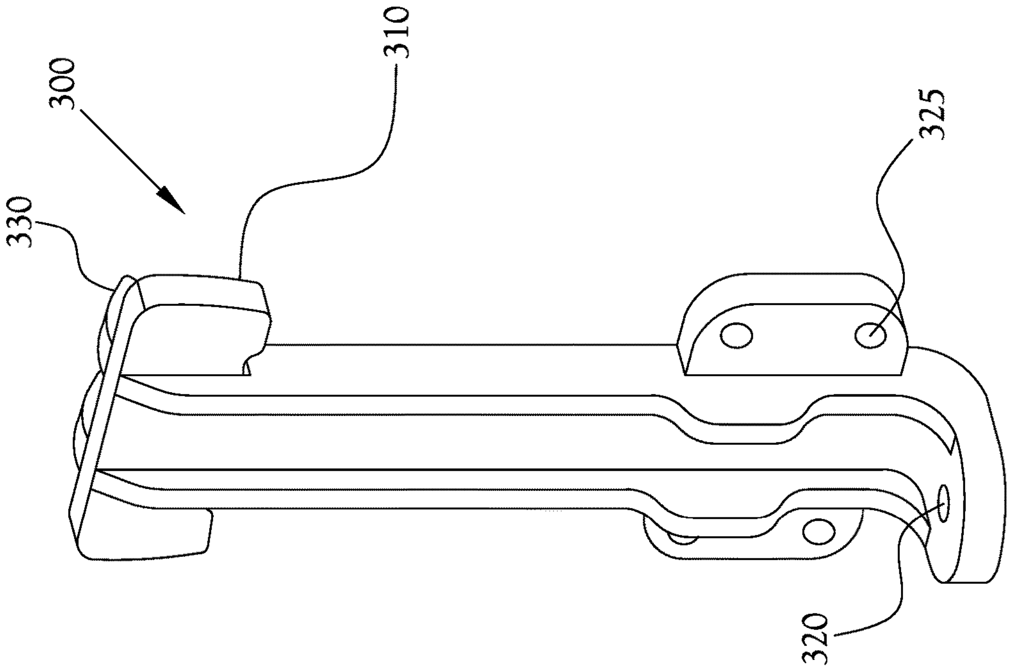
FIG. 4 is a perspective view of a shelf holder, according to an example embodiment of the present general inventive concept.

FIG. 4 shows a perspective view of a shelf holder 300 configured for holding a shelf securely within the rack 100. Two side tabs 310 are configured to fit matingly within the lower grooves 260 of the car members 110. Additionally, a rear tab 330 with a corresponding hole may be used to attach to a hanger 700 when used with at least one other shelf holder 300, as described in a subsequent paragraph. At the lower end of the shelf holder 300 is a bottom hole 320 of sufficient size to accept a wood screw such as, for example, the wood screw illustrated in FIG. 5 discussed herein. It is understood that the present general inventive concept is not limited to any particular type of screw, a variety of other fastening members could be used to attach a workpiece to the workpiece hanger. In one embodiment of the invention, the bottom hole 320 may be used to screw into a hidden edge of a cabinet shelf in order to support the shelf for spray finishing. Also shown in FIG. 4 are additional side holes 325 which may be used for attachment to the cabinet shelf, for other cabinet components, or any other object for spray finishing. The multiple side holes 325 may provide a more secure attachment, as opposed to a single bottom hole 320.

Figure 5:
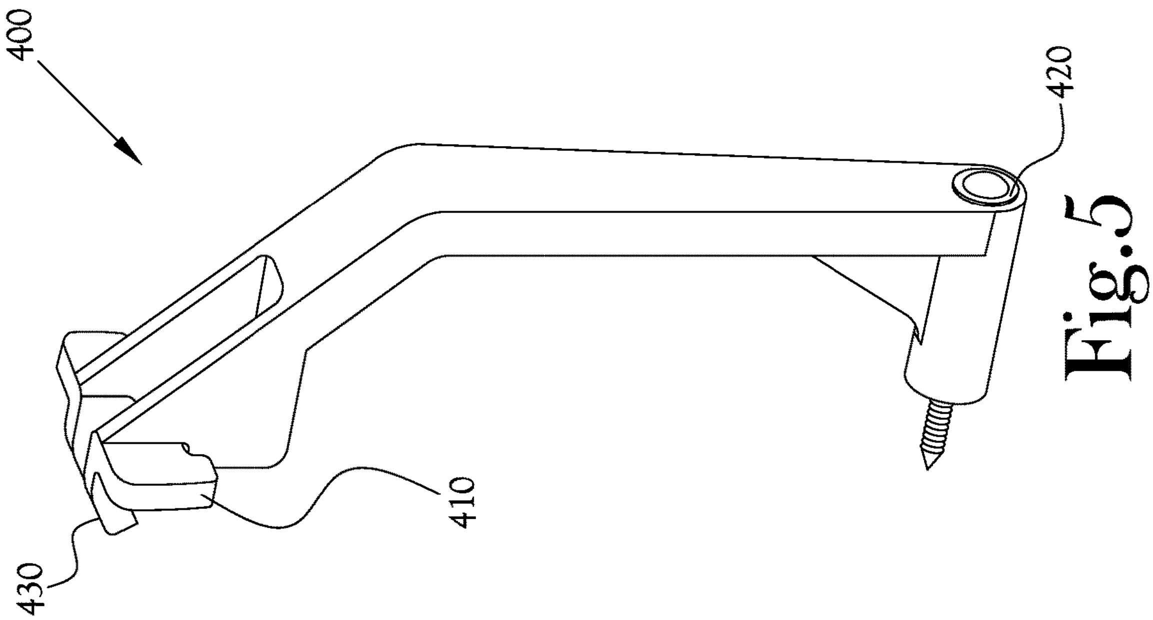
FIG. 5 is a perspective view of a drawer front holder, according to an example embodiment of the present general inventive concept.

FIG. 5 shows a perspective view of a drawer front holder 400 configured for holding a drawer securely within the rack 100. Two side tabs 410 are configured to fit matingly within the lower grooves 260 of the car members 110. Additionally, a rear tab 430 with a corresponding hole may be used to attach to a hanger when used with at least one other drawer front holder 400, as described in a subsequent paragraph. At the lower end of the drawer front holder 400 is a bottom hole 420 of sufficient size to accept a wood screw. In one embodiment of the invention, the bottom hole 420 may be used to screw into a hidden area, for example on the back of the drawer front, in order to support the drawer for spray finishing.

Figure 6:
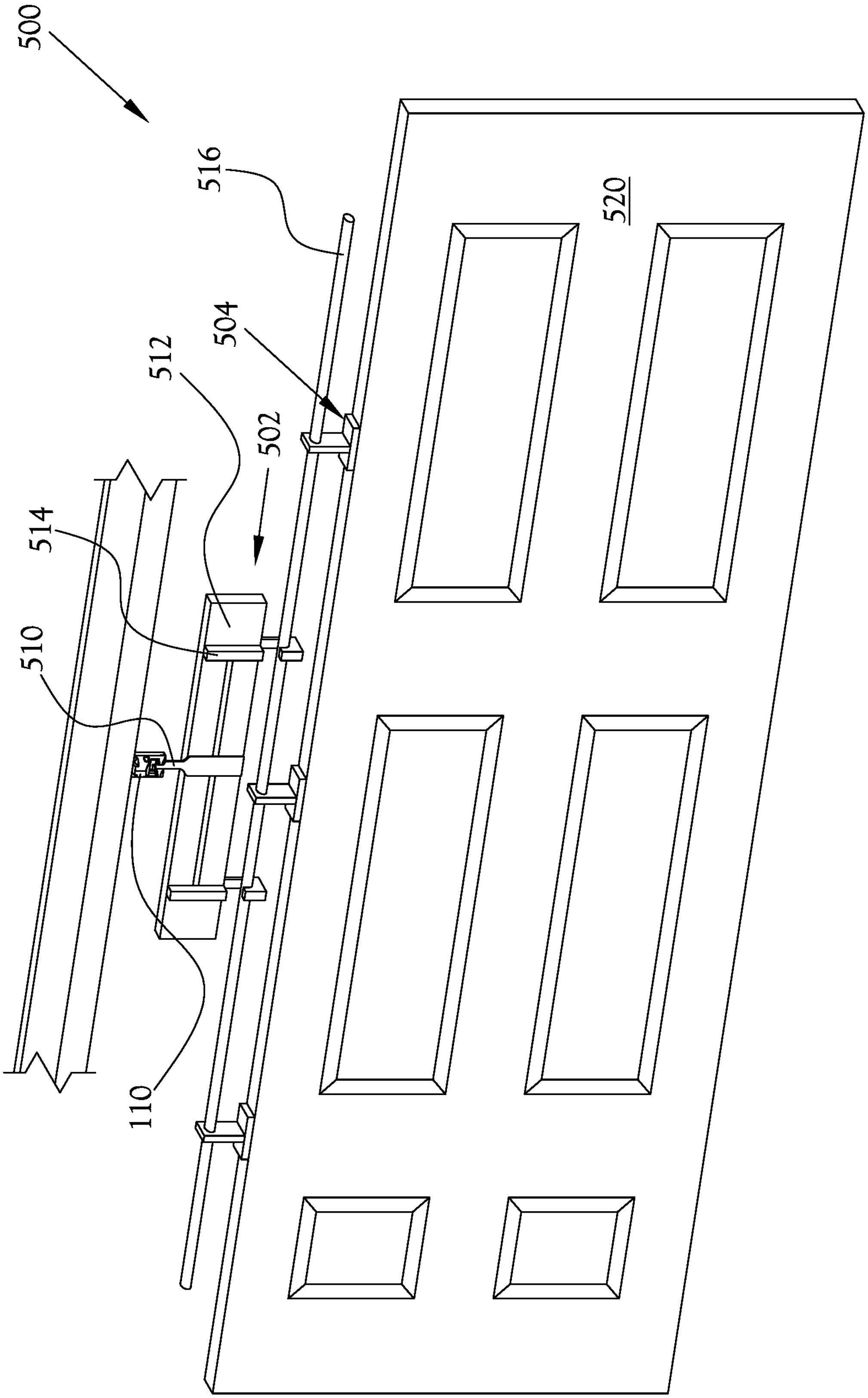
FIG. 6 is a perspective view of a door holder along with an attached door, according to an example embodiment of the present general inventive concept.

FIG. 6 shows a perspective view of a door holder 500 with attached door 520. The door holder 500 may consist of 2 distinct components, the door hanger 502 and one or more blocks 504, and a pipe 516 which can be inserted through holes in blocks 504. The door hanger 502 may include a center brace 510 which serves as the connection between the car member 110 and the door holder 500. The center brace 510 has two tabs (not shown) which fit matingly within the lower grooves 260 of the car members 110. The door hanger 502 may also include a support plank 512 and two or more hooks 514. The hooks 514 are attached to the support plank 512. In the embodiment shown in FIG. 6, slats are shown cut into the support plank 512. By loosening the screws connecting the hooks 514 to the support plank 512, an operator would then be able to move the hooks 514 in a lateral direction to provide for quick adjustment of the balance of the door 520 prior to spray refinishing. The blocks 504 may attach to the door 520 in the area of the hinge cutouts of the door 520, which will be hidden from view once the hinges are installed or reattached. The pipe 516 is inserted through holes in the blocks 504, and the door 520 may then be suspended onto the hooks 514 prior to refinishing of the door 520. The pipe 516 may be made of steel, wood, or other solid material. In another embodiment, an expandable hole mount (shown as 600 in FIG. 7A), that fits into the knob hole of the door 520, may be used to suspend the door 520 from the rack 100. Although the door hanger 502 may be made of wood as shown in FIG. 6, other materials are also possible, for example aluminum or steel.

Figure 7B:
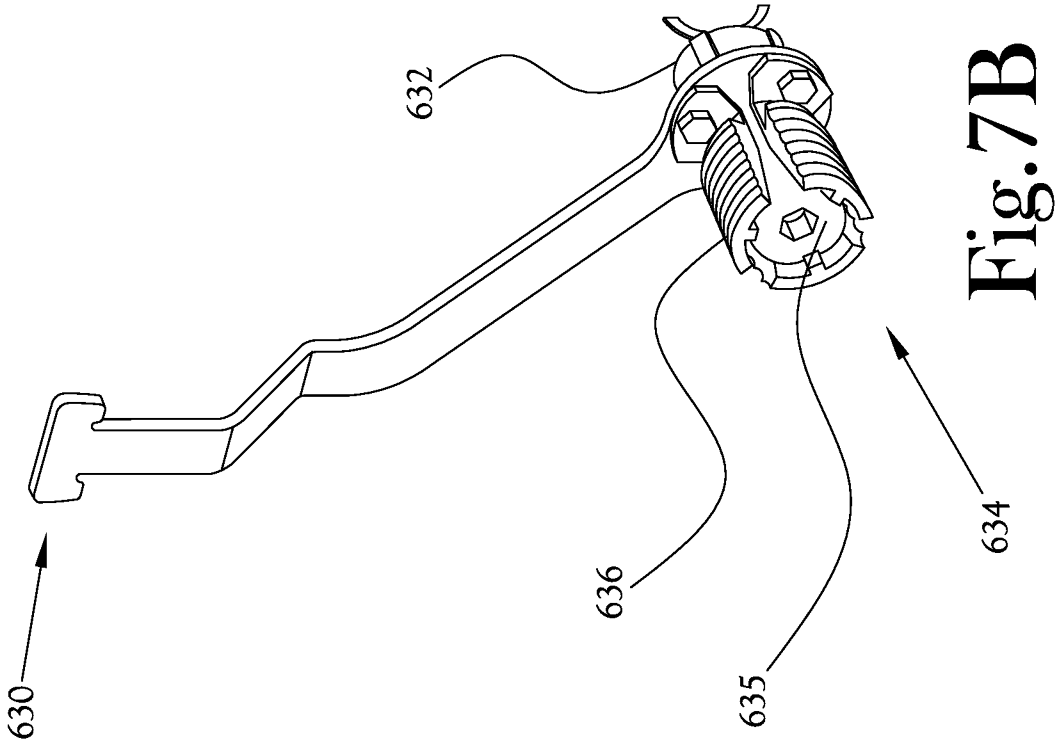
FIG. 7B is a front view of an expandable hole mount, according to an example embodiment of the present general inventive concept.
Figure 7A:
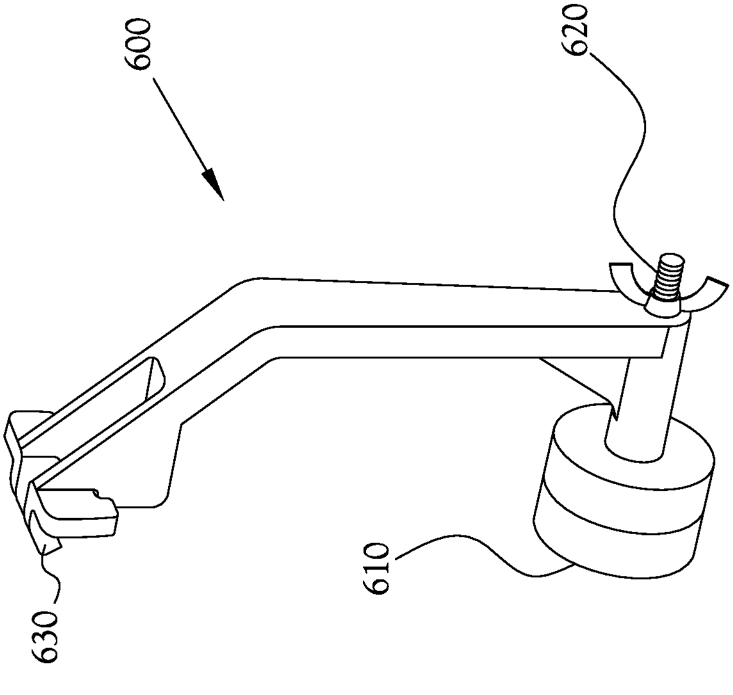
FIG. 7A is a front view of an expandable hole mount, according to an example embodiment of the present general inventive concept.

FIG. 7A shows an illustration of the expandable hole mount 600, which may be used to attach to a door knob opening, or other opening in a cabinet component or other object. The expandable hole mount 600 can act in the same fashion as the other attachment devices described above, which can be used to suspend cabinet components and other objects from the rack 100. The expandable hole mount 600 consists of a prior art expandable plug 610, with an actuation device 620, shown as a wing nut in FIG. 7A, but which could also be a lever, handle, knob, etc. Actuation of the expandable plug 610 creates a tight fit within a door knob opening, or other opening in a cabinet component or other object, and creates a secure attachment point. On the other end of the expandable hole mount 600 are two side tabs 630 which are configured to fit matingly within the lower grooves 260 of the car members 110. FIG. 7B shows an alternate embodiment of the expandable hole mount 600. In this embodiment, a screw knob 632 is rotated to actuate expanding core components 634 which may be used to attach to a door knob opening, or other opening in a cabinet component or other object. The expanding core components 634 consist of an inner block 635 and a sleeve 636, and rotation of the inner block 635 by rotating the screw knob 632 causes the sleeve 636 to move in an outward direction, which can cause it to provide a secure attachment within the knob hole of a door 520.

Figure 8:
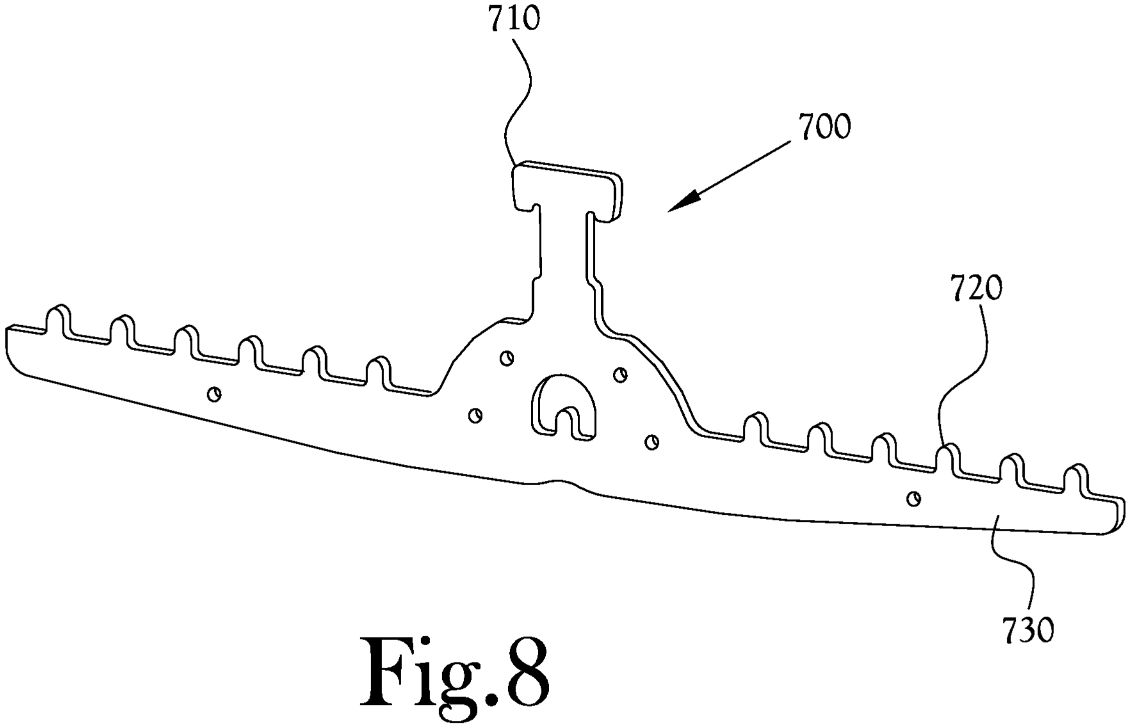
FIG. 8 is a front view of a hanger, according to an example embodiment of the present general inventive concept.

FIG. 8 shows a hanger 700 which can be used to suspend cabinet components and other objects from the rack 100. The hanger 700 can come in different sizes based on the size of the cabinet component or other object it is intended to support. At the top of the hanger 700 are two side tabs 710 which are configured to fit matingly within the lower grooves 260 of the car members 110. Also located on the hanger 700 are multiple upward tabs 720, which are generally equally spaced apart across the hanger rail 730, and which can be used with finishing clips (shown as 810 in FIG. 9). Additional embodiments may include a custom hangar 700 with multiple holes in different locations to support an operator created configuration.

Figure 9:
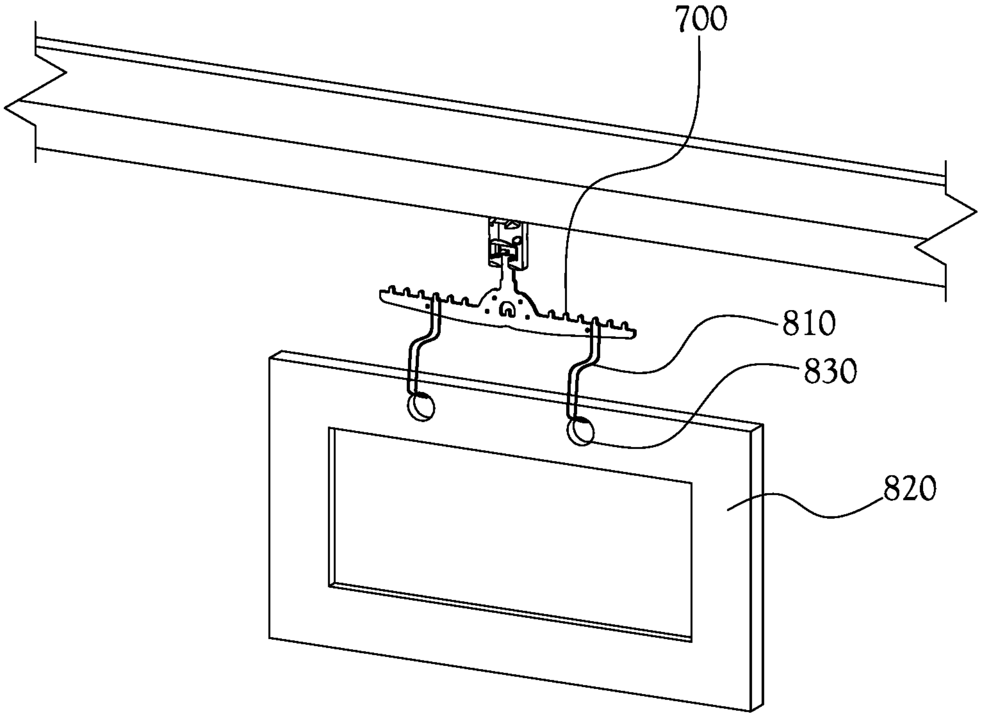
FIG. 9 is a perspective view of a finishing clip, being used in conjunction with a hanger, according to an example embodiment of the present general inventive concept.

FIG. 9 shows the hanger 700 being used in conjunction with the finishing clips 810 to support a cabinet door 820 from the rack 100. The upper end of the finishing clips 810 may form a loop which can hang over the upward tabs 720, and the upward tabs 720 resist movement of the finishing clips 810 and cabinet door 820 or other object in a lateral direction. The bottom end of the finishing clips 810 may form a hook which can fit within the hole 830 of the cabinet door 820 or other object in order to secure the cabinet door 820 or other object prior to and during spray finishing. Given their generally looser fit within a hole 830 of the cabinet door 820 or other object, in comparison with the expandable plugs 610 described above, the finishing clips 810 are intended to be used in pairs with the hanger 700.

Figure 10A:
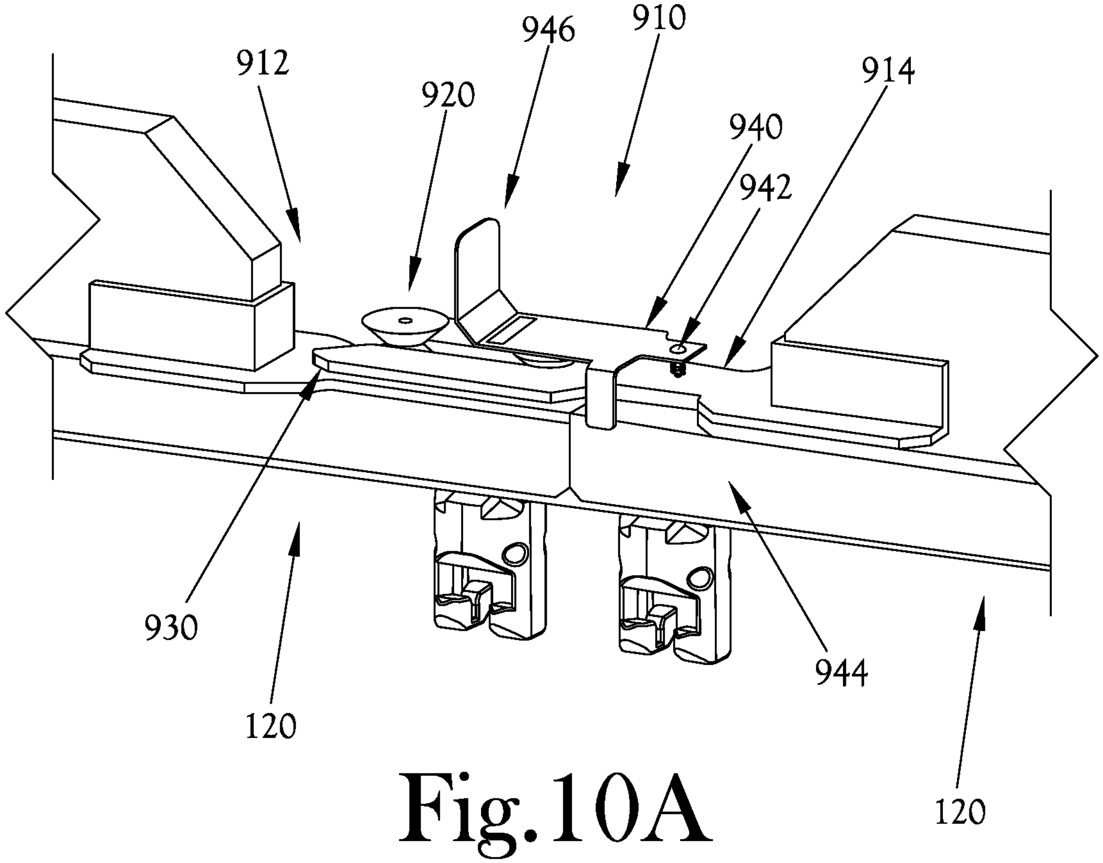
FIG. 10A is a top view of a rail coupling, according to an example embodiment of the present general inventive concept.

FIG. 10A shows a rail coupling 910 which allows a rack 100 to be configured to join securely with other racks 100. The horizontal rail 120 of each rack 100 is shown on the right and left of FIG. 10. The rail coupling 910 may be composed of two distinct parts, the spool coupler 912 and the fork coupler 914. These two parts join together to provide for proper alignment and attachment of the two racks 100. Also shown in FIG. 10A are the spools 920, fork 930, latch 940, and latch release handle 946. A latch limiting and adjustment screw 942 allows the user to adjust the latch for a secure fit. A side plate 944 is configured to overlap the horizontal rail 120 when the horizontal rails 120 are in a coupled state (as shown in FIG. 10A), in order to promote proper alignment of the horizontal rails 120.

Figure 10B:
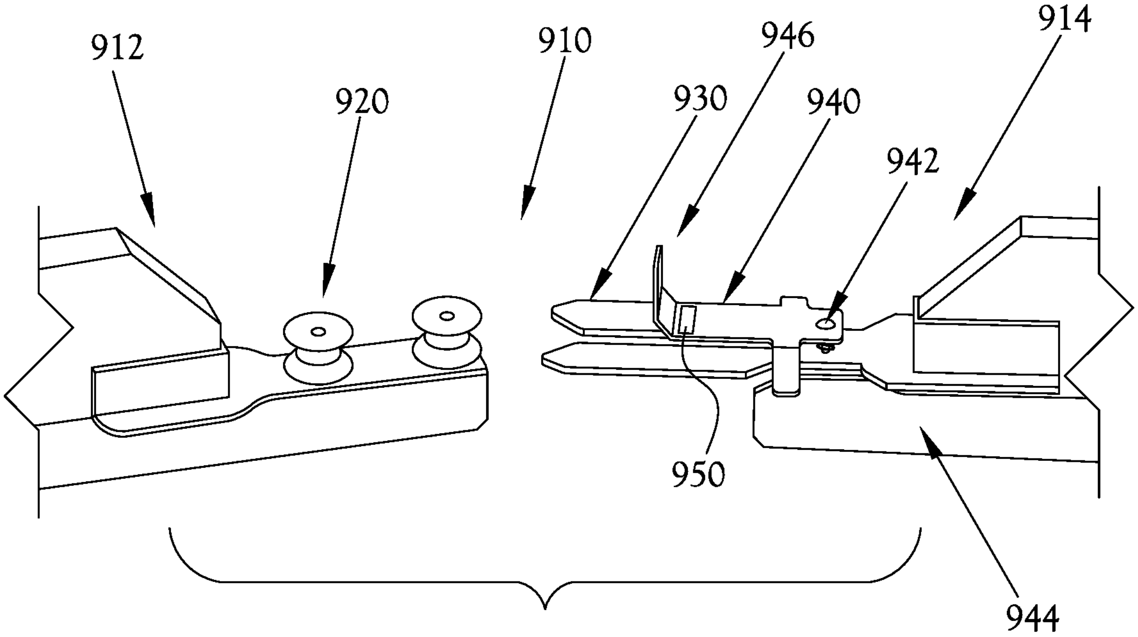
FIG. 10B is a front view of a rail coupling, according to an example embodiment of the present general inventive concept.

FIG. 10B shows a view of the spool coupler 912 and the fork coupler 914 in an uncoupled state. As the spool coupler 912 and the fork coupler 914 are advanced towards each other, the spools 920 are inserted between the arms of the fork 930, providing for proper alignment of the two racks 100. A latch tab 950 may be configured to mate with one of the spools 920, so that once the spools 920 are fully inserted between the arms of the fork 930, and the horizontal rail 120 ends meet up, the latch tab 950 engages with the spool 920 creating a locking fit. Moving the latch 940, by means of the latch release handle 946 in a vertical direction releases the rail coupling 910. FIG. 10A shows the engaged position of the two racks 100.

Figure 10C:
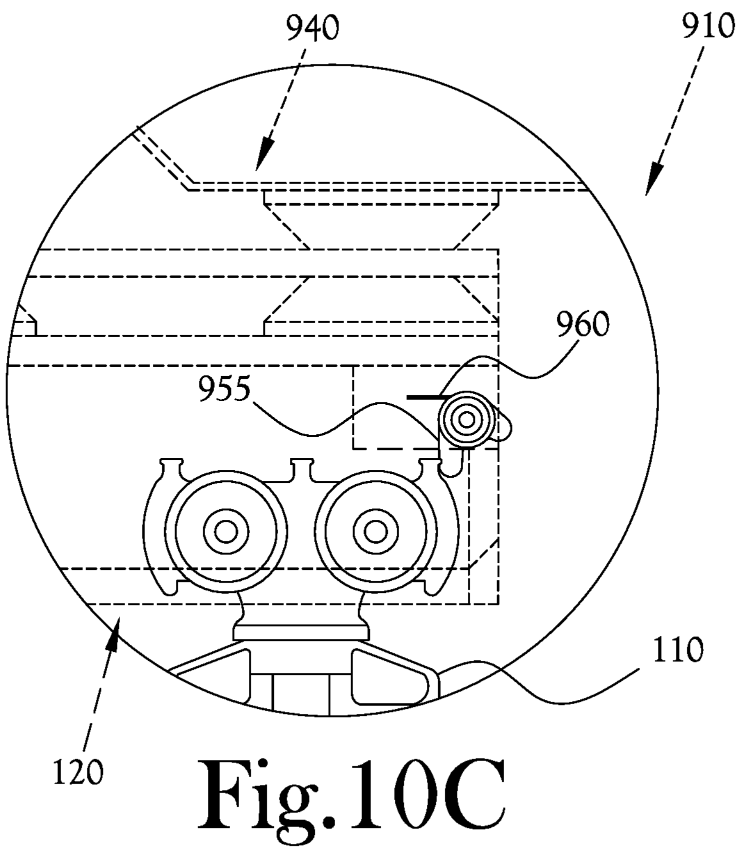
FIG. 10C is an interior view of a rail coupling, according to an example embodiment of the present general inventive concept.

Shown in FIG. 10C is an interior view of the distal end of the horizontal rail 120. A stopper cam 955 is shown attached near the end of the horizontal rail 120. The stopper cam 955 has a limited range of motion in the circumferential direction and serves to prevent the car members 110 from rolling off the ends of the rack 100 when uncoupled. As shown in FIG. 10C, with the car member 110 resting against the stopper cam 955 near the end of the horizontal rail 120, the stopper cam 955 has reached the limit of its range of motion in the counter-clockwise direction, and the car members 110 are prevented from rolling off the ends of the rack 100. A torsion spring 960 is attached to the stopper cam 955 in order to bias the stopper cam 955 in a position so that it contacts the car member 110 as the car member 110 approaches the end of the of the horizontal rail 120, when the rack 100 is in an uncoupled state.

Figure 10D:
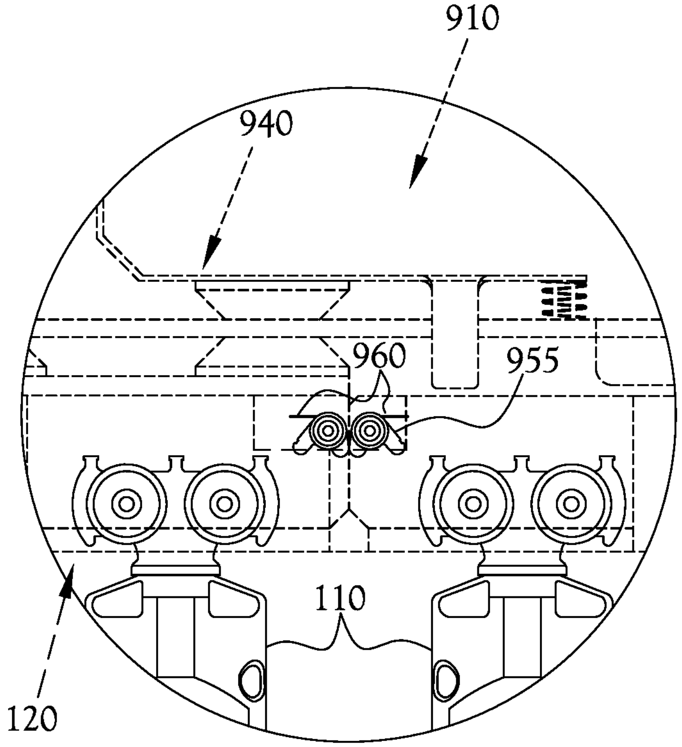
FIG. 10D is an interior view of a rail coupling, according to an example embodiment of the present general inventive concept.

FIG. 10D shows an interior view of the distal end of the horizontal rails 120 in a coupled state. In this case, the stopper cams 955 rotate against the biasing force of the torsion spring 960 and are no longer in position to engage with a car member 110 as it approaches the end of the of the horizontal rail 120. Thus, when the rack 100 is in a coupled state, the car members 110 can move freely between racks 100.

Figure 10E:
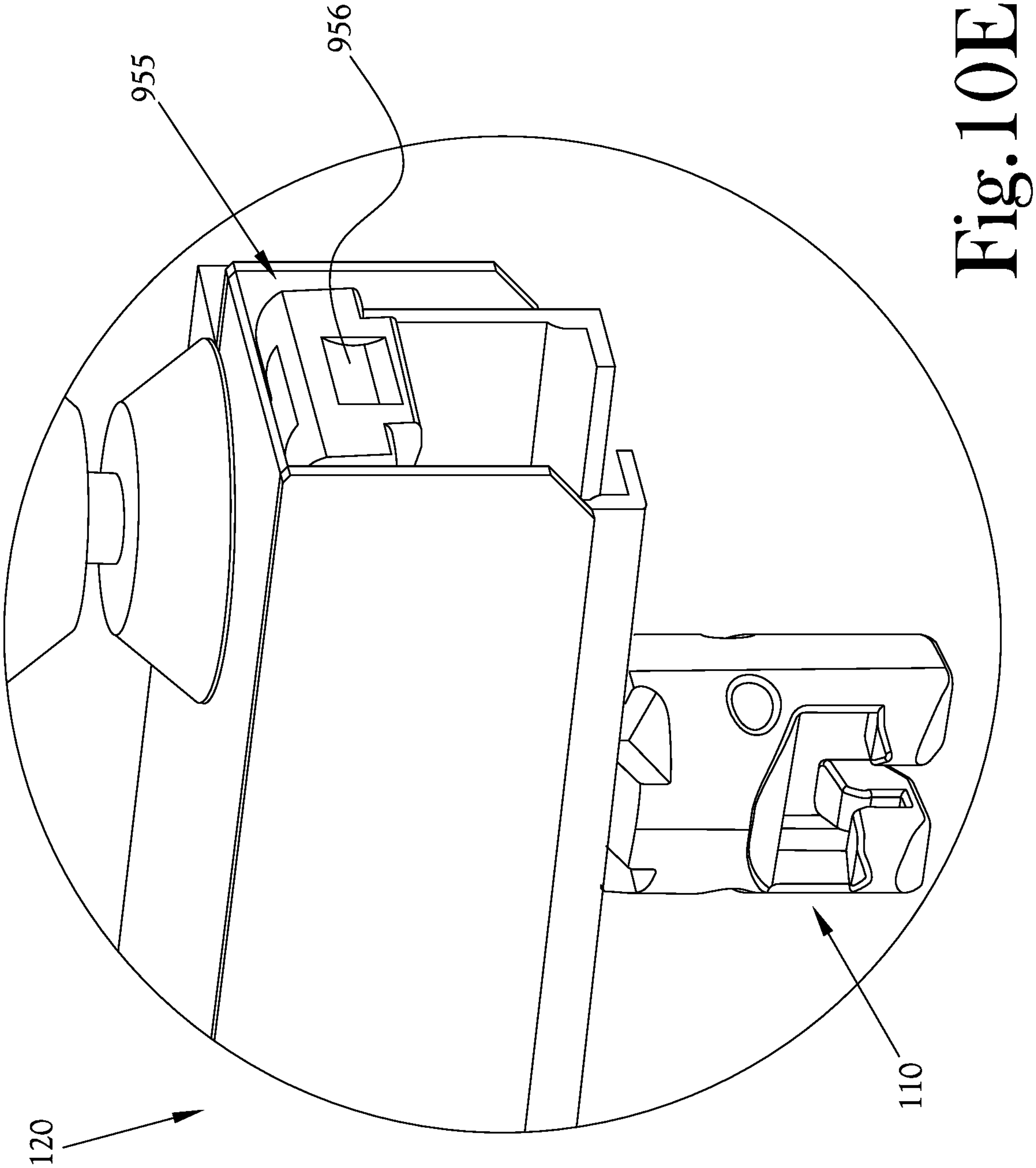
FIG. 10E is a perspective view of a rail coupling, according to an example embodiment of the present general inventive concept.

FIG. 10E shows a view of one end of a horizontal rail 120 when the rack 100 is in an uncoupled state, including a stopper cam finger relief 956. By depressing the stopper cam finger relief 956, the stopper cam 955 is no longer in position to engage with a car member 110 as it approaches the end of the of the horizontal rail 120, and may be used to manually remove a car member 110, for example to service it.

In one embodiment of the present general inventive concept, a rack 100 as shown in FIG. 1 attached to a movable cart 150 may be coupled to a fixed rack 100 in order to provide a stable platform during the spray finishing process. The fixed rack 100 may be attached to a wall, ceiling, or other immovable surface. After suspending the cabinet component(s) from the car member 110 of the rack 100 attached to a movable cart 150, the rack 100 may then be moved into position in line with the fixed rack 100. The spool coupler 912 of one rack 100 may then be joined with the fork coupler 914 on the other rack 100 until they are locked in place, in order to provide a substantially pivot-free connection. At that point, the operator may proceed with spray finishing of the cabinet components. In one embodiment, one rack 100 may be used to spray a cabinet component, after which the sprayed and dried cabinet component may be loaded onto the other rack 100 for transport or storage or the like.

Example embodiments include providing systems for retaining and maneuvering cabinetry items from one or more rack systems while applying coatings to the cabinetry items, including providing one or more car members configured to support the cabinetry items, providing one or more attachment devices configured to be removably attachable to the one or more car members and to the cabinetry items, providing a horizontal rail configured to support the one or more car members and to provide a channel for the one or more car members to move in a generally parallel direction with respect to the rail, providing a base configured to support the weight of the rail, one or more car members, and cabinetry items such that the system supports the cabinetry item from the one or more of the attachment devices, and supports the attachment device and cabinetry item from one of the one or more car members such that the cars can be moved along the horizontal rail and rotated until the cabinetry item is in position for spray finishing.

The systems and methods can also include providing a rail coupling attached to the end of one or more horizontal rails to facilitate mating or coupling of one rack system with another to facilitate movement of items to be spray coated from one rack to another.

While most of the example embodiments described so far have included car members that are equipped with rotatable workpiece hanger mounts that fit matingly with various workpiece hangers, sometimes referred to herein as attachment devices, such as the described drawer front holder, shelf holder, door holder, and so on, various other example embodiments of the present general inventive concept may provide such workpiece hanger mounts in a host of other device/assembly configurations. For example, the mating grooves 260 configuration of FIGS. 3A-B may be provided to a workpiece hanger mount that is configured to be attached to a support surface so as to remain stationary, or at a fixed position, on that support surface, or may be configured to rotate about an axis extending away from that support surface while remaining attached to the same point, as well as other movable car embodiments. In the remaining example embodiments described herein, the term workpiece hanger mount, or simply hanger mount, may be used to describe the portion generally referred to as the lower assembly 250 of FIGS. 3A-B. Also, the various attachment devices such as those described in FIGS. 4-6 may be referred to herein generally as workpiece hangers, while the various components attached to or suspended from the workpiece hangers may be referred to generally as workpieces. As illustrated in FIGS. 2-9, and as described in relation to those figures, the workpiece hanger mounts are configured with a grooved configuration that fits matingly with a generally T-shaped connecting configuration arranged at the top of the various workpiece hangers. The configuration that allows such a beneficial mating fit of the various different selectable workpiece hangers to the same hanger mount will now be described in more detail in relation to various example embodiments of the hanger mount and hanger mount assemblies.

Figure 11B:
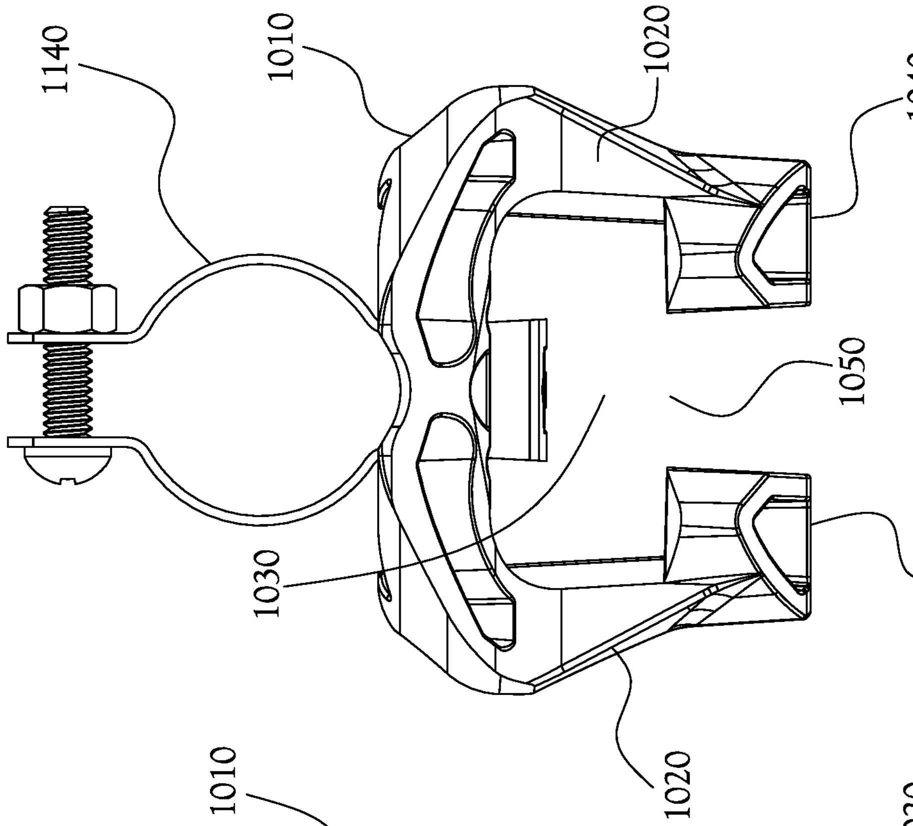
FIGS. 11A-B illustrate perspective and front views, respectively, of a workpiece hanger mount according to an example embodiment of the present general inventive concept.
Figure 11A:
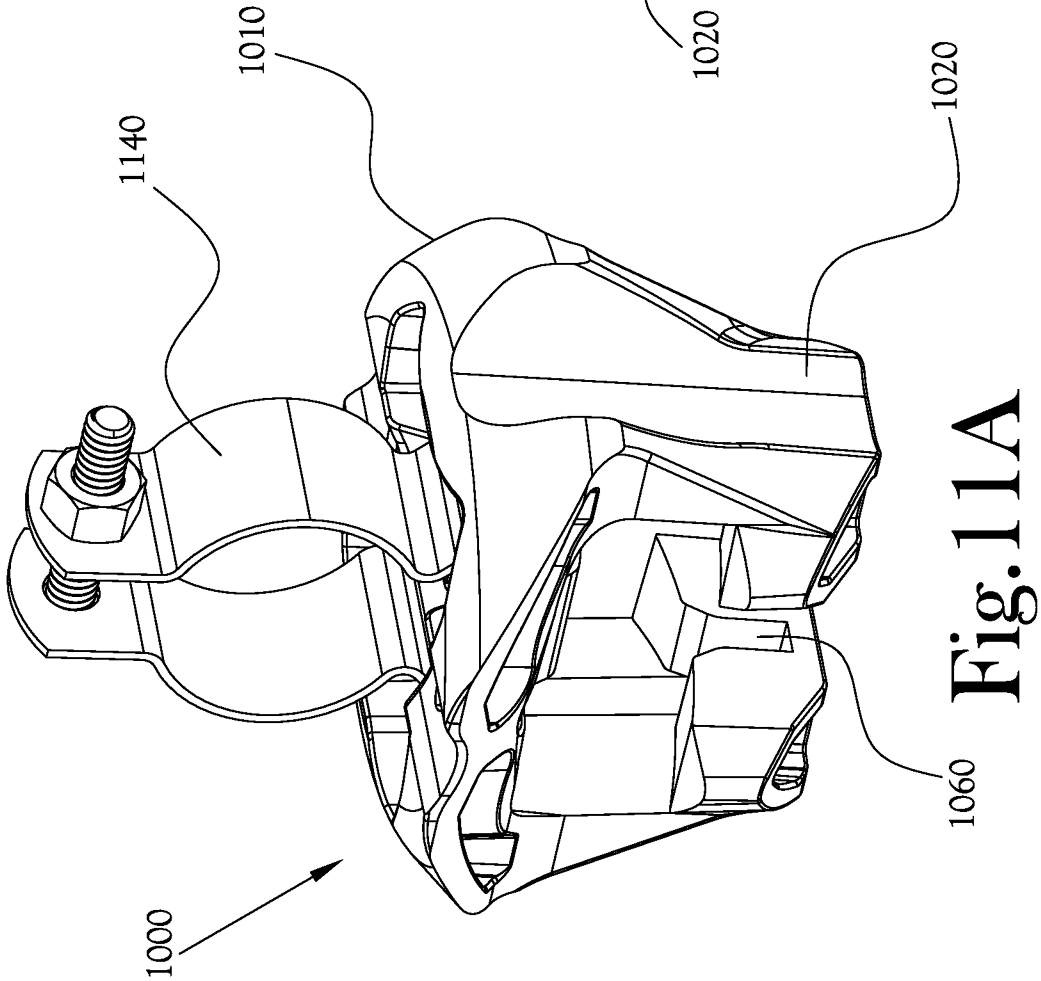

FIGS. 11A-B illustrate perspective and front views, respectively, of a workpiece hanger mount according to an example embodiment of the present general inventive concept. As illustrated in FIGS. 11A-B, a workpiece hanger mount 1000 includes a general body portion 1010 and two side portions 1020 that extend downward from the body portion 1010 so as to define an upper open space 1030 between upper parts of the side portions 1020. An inwardly extending shelf or flange portion 1040 is provided at the distal end of each of the side portions 1020, the flange portions 1040 being arranged so as to extend toward one another and define a lower open space 1050 between the distal ends of the flange portions 1040. The arrangement of the lower open space 1050 located below and opening into the wider upper open space 1030 roughly corresponds to the generally T-shaped upper portion of the workpiece hangers illustrated in FIGS. 4-8 such that the T-shaped upper portion can be passed through the opening spaces of the hanger mount 1000 from the front or the back, with the wider portion of the T-shape passing through upper open space 1030, and the "stem" portion below the wider portion passing through the lower open space 1050. This facilitates convenient mounting of the workpiece hangers in the hanger mount 1000 as described in relation to the previously illustrated example embodiments. In various example embodiments a back wall of such a hanger mount may be closed, such that the open spaces 1030,1050 are only accessed from the front of the hanger mount. A groove 1060 is formed in each of the flange portions 1040, extending downward from the upper surface of the flange portions 1040 and arranged to be aligned with one another through the lower open space 1050. The grooves 1060 each extend from a distal end of the flange portions 1040 toward the respective side portions 1020 of the hanger mount 1000, and are arranged to accept portions of the workpiece hangers as previously described in relation to FIGS. 2-9, and which will be described in more detail herein.

Figure 12B:
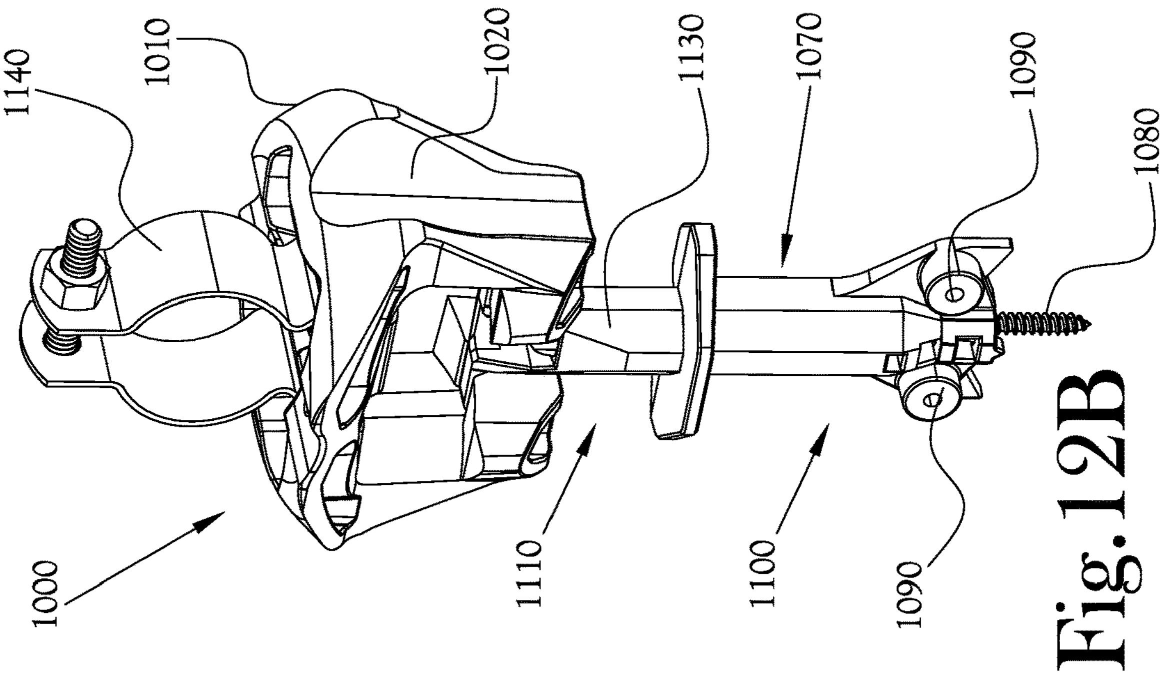
FIGS. 12A-B illustrate the mounting of a workpiece hanger in the workpiece hanger mount of FIGS. 11A-B according to an example embodiment of the present general inventive concept.
Figure 12A:
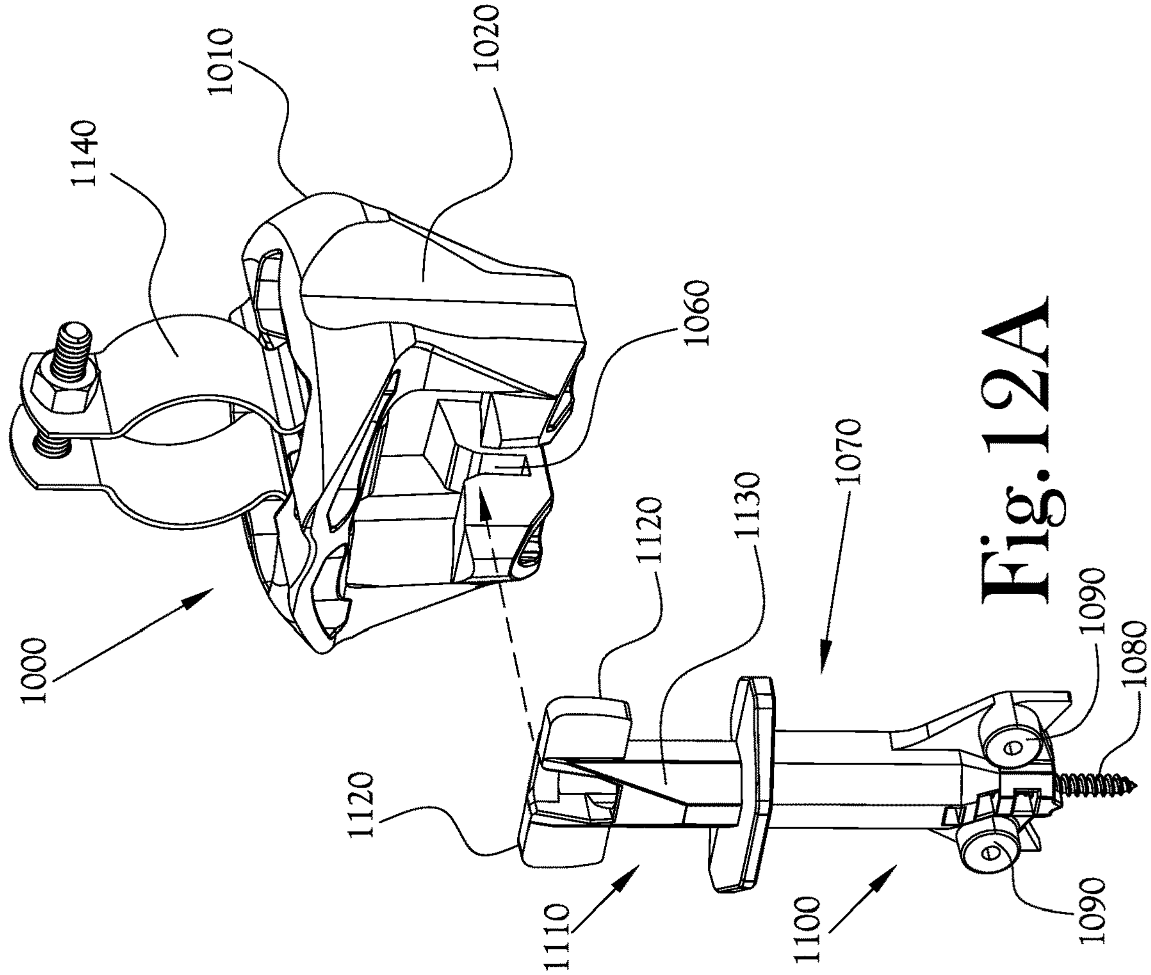

FIGS. 12A-B illustrate the mounting of a workpiece hanger in the workpiece hanger mount of FIGS. 11A-B according to an example embodiment of the present general inventive concept. In the example embodiment illustrated in FIGS. 12A-B a workpiece hanger 1070 is configured as a universal hanger that extends substantially directly downward from the hanger mount 1000 when mounted therein, with a screw member 1080 that extends down substantially along a longitudinal axis of the workpiece hanger 1070 to be screwed directly into an upper surface of a workpiece. The universal hanger configuration may also include, as illustrated, other screw apertures 1090 to allow lateral connection to a workpiece. In various example embodiments the workpiece hangers may be configured such that they only contact workpieces in one or more locations that are eventually hidden by assembly of the workpieces. As previously described in relation to FIGS. 4-8, the workpiece hanger 1070 includes a lower portion 1100 that is configured to be attached to a workpiece, and an upper portion 1110 that is configured to be received in the hanger mount 1000 to hang the workpiece from the hanger mount 1000 via the workpiece hanger 1070. Since the lower portion 1100 of the workpiece hanger 1070 can be configured in a host of different ways according to the workpiece to be suspended from the hanger mount 1000, with the upper portion 1110 having the same general configuration regardless of the configuration of the lower portion 1100, the same hanger mount 1000 can be used for a host of differently configured workpiece hangers. The upper portion 1110 of the workpiece hanger 1070 includes two side tabs 1120 extending away from one another and configured to be respectively received in the grooves 1060 of the hanger mount 1000. The side tabs 1120 extend away from at least a portion of an elongated member 1130 that extends away from the side tabs 1120. Thus, in the example embodiment illustrated in FIGS. 12A-B, the elongated member 1130 and side tabs 1120 of the upper portion 1110 of the workpiece hanger 1070 are configured in a T-shape such that the workpiece hanger 1070 can be hung from the hanger mount 1000 by passing the side tabs 1120 through the upper open space 1030, with the part of the elongated member 1130 proximate the side tabs 1120 passing through the lower open space 1050, until the side tabs 1120 are over the grooves 1060, and then lowering the side tabs 1120 into the grooves 1060. As the side tabs 1120 are formed to generally correspond with the dimensions of the grooves 1060, this provides a stable coupling of the workpiece hanger 1070 to the hanger mount 1000. The bottom of the side tabs 1120 at least partially rest on an upper surface of the grooves 1060, due to gravity, providing support so that the workpiece hanger 1070 cannot be moved further downward, and the front and/or back surfaces of the side tabs 1120 rest against, or in close proximity to, one or both sides of the grooves 1060 to provide support so that the workpiece hanger 1070 is limited, if not entirely prohibited, from movement in the front and back directions relative to the hanger mount 1000. In some example embodiments the overall length of the grooves 1060 between the ends of each proximate the side portions 1020, are formed to correspond to the overall length from end to end of the side tabs 1120, so that the ends of the side tabs 1120 contact the end surfaces of the grooves to inhibit or prohibit movement of the workpiece hanger 1070 from side to side relative to the hanger mount 1000. In various example embodiments, the grooves 1060 are formed so as to correspond to the thickness and/or length of the side tabs 1120 such that a friction fit may be formed with the front/back surfaces and/or end surfaces of the side tabs 1120. For example, if the width of the grooves 1060 are formed to register with the thickness of the side tabs 1120, a friction fit may be formed that prohibits any movement of the workpiece hanger 1070 in the front and back directions relative to the hanger mount 1000. Similarly, if the length of the grooves 1060 are formed to register with the overall length of the side tabs 1120, a friction fit may be formed that prohibits any movement of the workpiece hanger 1070 in a lateral direction relative to the hanger mount 1000. In various example embodiments the grooves 1060 may be formed to provide a slip fit for one or more of the dimensions of the side tabs 1120, in order to provide easier mounting and unmounting of the workpiece hanger 1070 from the hanger mount 1000. In various example embodiments, as illustrated in FIGS. 11A-12B, the tops of the grooves 1060 may flare out to provide more accessible guidance of the side tabs 1120 into the grooves 1060. In other various example embodiments the bottoms of the side tabs 1120 may be tapered to a smaller thickness to provide a similar more accessible guidance into the grooves 1060. Thus, with the mating fit of the hanger mount 1000 to the upper portion 1110 of the workpiece hanger 1070, different workpiece hangers, and therefore different workpieces, can be quickly and easily mounted to the hanger mount 1000 for spraying or other processes. The geometry of the matingly fitting components allows a simple and ergonomic hang/unhang motion, is economical to produce, and also transfers stability to the hanging workpiece. In various example embodiments, the mating parts are effectively "hidden" when the workpiece hanger 1070 is mounted on the hanger mount 1000. In various example embodiments the grooves accepting the T-shaped connection of the workpiece hangers could be configured to be offset from the rotational axis of the offset hanger, such as, for example, being formed outside a perimeter of the general body portion of the hanger mount. In various example embodiments of the present general inventive concept the mating components described herein could be reversed, with the T-shaped connection provided to a hanger mount, and a grooved assembly provided to the upper portion of one or more workpiece hangers that is configured to be receive the T-shaped connection by moving the grooves of the workpiece hanger over and onto the T-shaped connection. Further, various example embodiments may provide a host of differently configured mating fits between a workpiece hanger mount and a workpiece hanger without departing from the scope of the present general inventive concept. For example, various example embodiments may provide a plurality of grooves that may also be differently configured to fit matingly with corresponding tabs of a workpiece hanger, such as a plurality of grooves arranged on one or both of the flange portions described herein. Such grooves could be formed in an X-pattern, or otherwise be angled away from one another, or could be arranged in a parallel fashion, and so on. Rather than having two side portions forming an open space that receives a tabbed workpiece hanger portion to allow a tab member be entered into a groove from above, such grooves could be formed directly in or on the workpiece hanger mount body such that the workpiece hanger is entered from a position forward from the groove or grooves, to provide a convenient approach path for the workpiece hanger. For example, two aligned but separated grooves such as those described herein could be formed on a single portion of the mount body facing a worker in at least one orientation of the workpiece hanger mount. Various example embodiments may provide a workpiece hanger mount that has a single groove to accept a single workpiece hanger tab therein to fit matingly and inhibit movement of the workpiece hanger on one or more axes of direction. Various example embodiments may provide a mount body having at least one groove portion having at least a first mating surface, and a workpiece hanger having an upper portion with at least one tab member having at least a second mating surface configured such that the first and second mating surfaces mate with one another to securely hold the workpiece when mounted on the workpiece hanger mount, and may further securely hold the workpiece proximate a center of gravity of the workpiece so as to inhibit lateral movement of the workpiece relative to the workpiece hanger mount.

Figure 13:
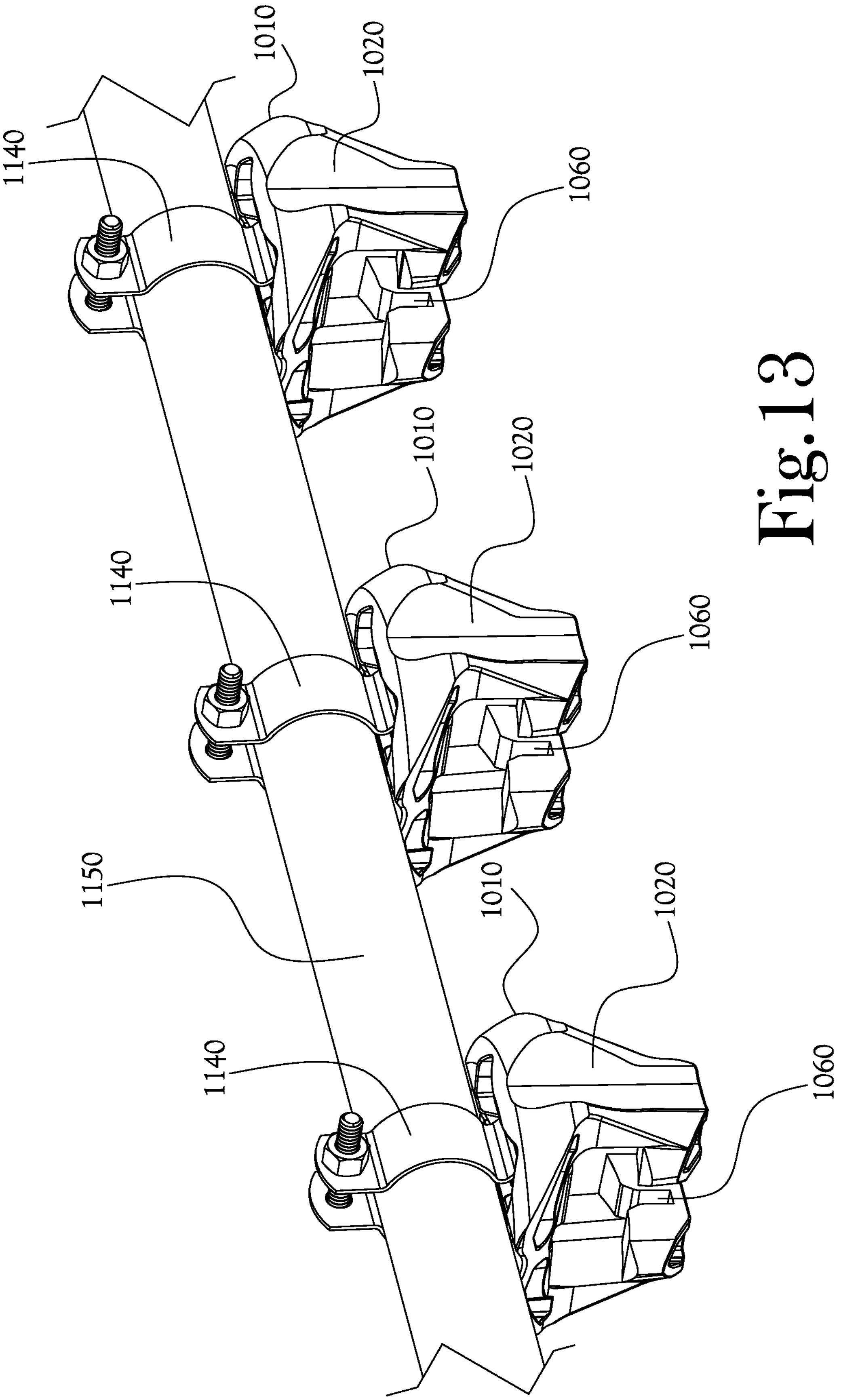
FIG. 13 illustrates a plurality of hanger mounts coupled to a bar of a support rack according to an example embodiment of the present general inventive concept.

As illustrated in FIGS. 11A-12B, the hanger mount is provided with an attachment portion 1140 configured to couple the hanger mount 1000 to a support surface in a stationary position. In this example embodiment, the attachment portion 1140 is configured as a bracket designed to be affixed to a cylinder shape such as a rod of a support rack. In various example embodiments the attachment portion 1140 may be removably coupled to the hanger mount 1000 such that a user can selectively provide different attachment portions to the same hanger mount 1000, depending upon the desired support surface. FIG. 13 illustrates a plurality of hanger mounts coupled to a bar 1150 of a support rack according to an example embodiment of the present general inventive concept. As illustrated in FIG. 13, each of the hanger mounts 1000 are affixed to the bar 1150 of the support rack at specific locations along the bar 1150. Thus, in contrast to the hanger mounts illustrated in FIGS. 3A-B, for example, the hanger mounts 1000 of FIG. 13 are not configured to be rolled along a rail as a car member, but are rather configured to be stationary at the attachment location and not move toward any adjacent hanger mount 1000. Also, while the hanger mounts of FIGS. 3A-B are configured to be rotatable relative to the attachment portion suspending those hanger mounts from a rail, the hanger mounts 1000 of FIGS. 11A-13 are configured to remain at a fixed orientation relative to the attachment portion 1140. As such, a plurality of workpieces attached to workpiece hangers 1070 respectively mounted to the hanger mounts 1000 can maintain a fixed distance from one another, and also not rotate so as to contact one another. In this way, workpieces can be suspended from a rack after various processes without danger of the workpieces contacting each other while, for example, paint dries, and so on. Although many of the example embodiments herein are described as being hanger mounts attached to various types of racks, other mounting configurations are possible without departing from the scope of the present general inventive concept. For example, hanger mounts of various embodiments may be configured to be mounted directly to a flat surface such as, for example, 2× lumber. Such a hanger mount may be configured with screw holes passing through the hanger mount body from top to bottom to allow the mount to be suspended from above from such a surface, and/or with screw holes passing through the hanger mount body from front to back to allow the mount to be suspended on a wall surface or vertically arranged board or the like.

Figure 15:
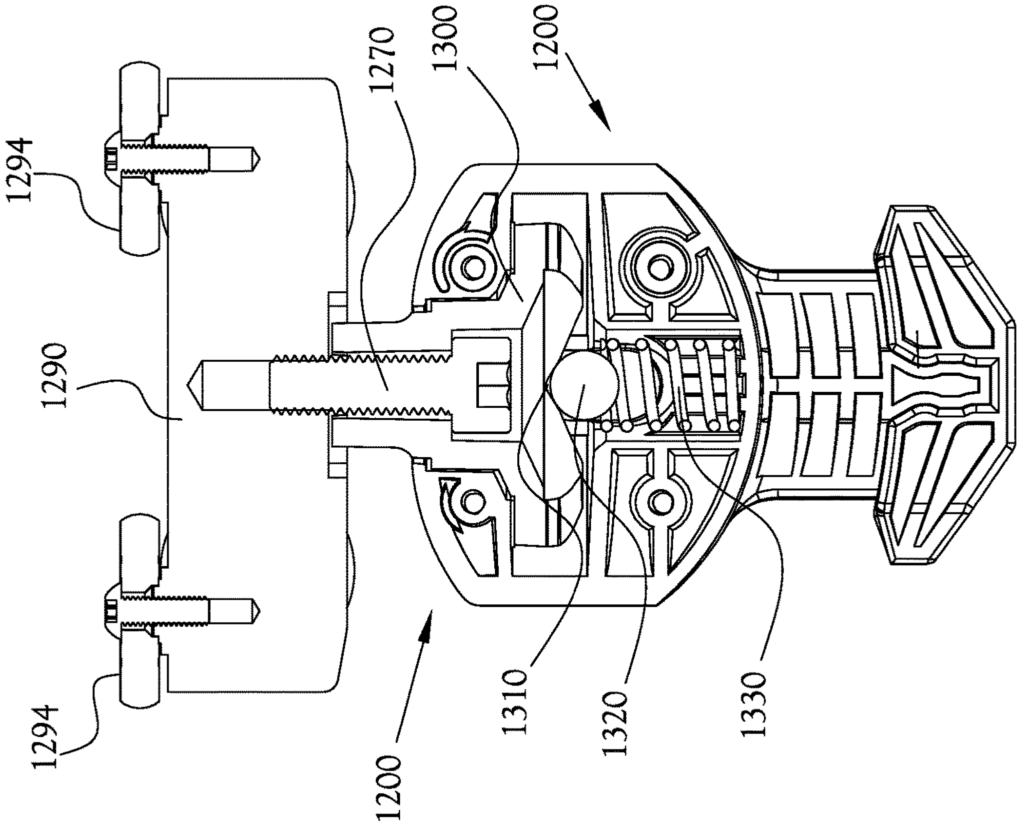
FIG. 15 illustrates a hanger mount that is rotatable about a movable attachment member according to another example embodiment of the present general inventive concept.
Figure 14:
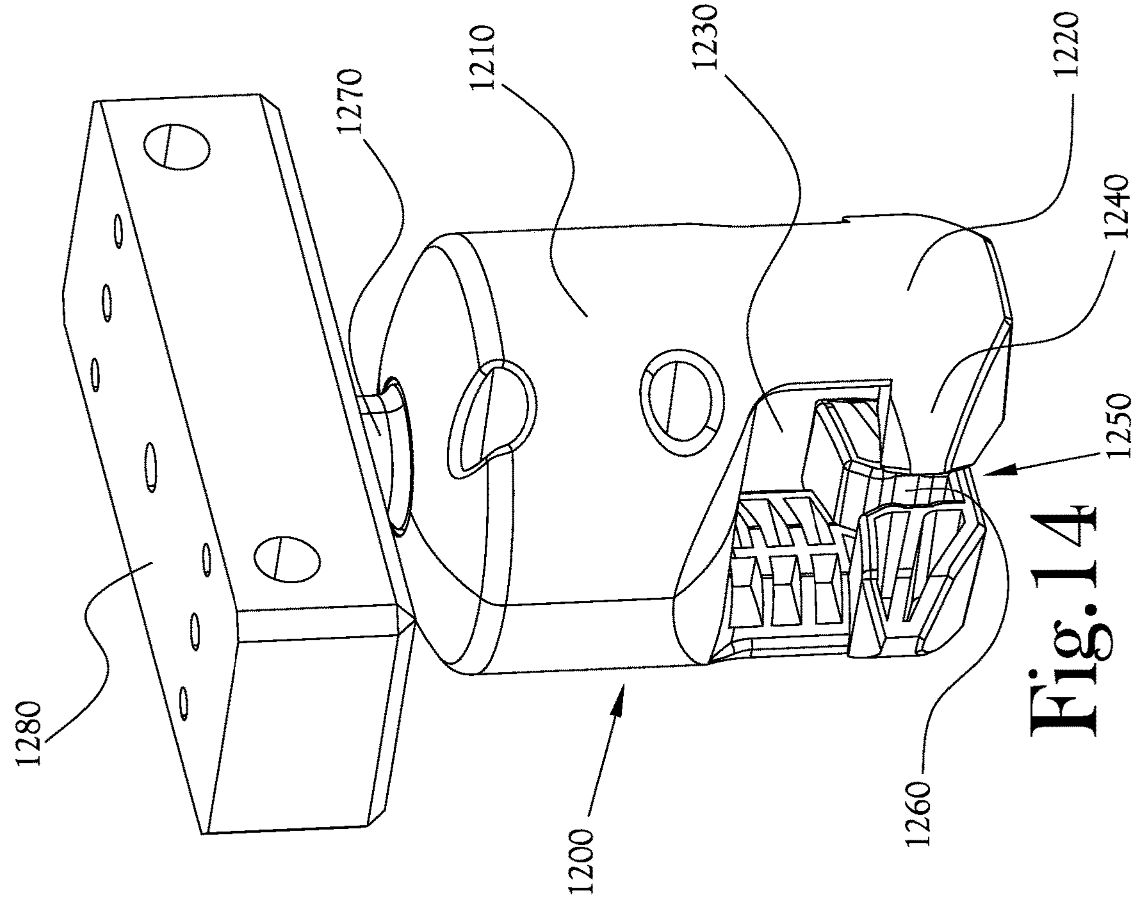
FIG. 14 illustrates a hanger mount that is rotatable about a stationary attachment member according to an example embodiment of the present general inventive concept.

As previously noted and described, hanger mounts according to various example embodiments of the present general inventive concept may be configured to be rotatable relative to an attachment device/assembly coupling the hanger mounts to a support surface, or may be configured to maintain a fixed orientation relative to the attachment device/assembly. Also, hanger mounts according to various example embodiments may be provided with attachment devices/assemblies that are configured to maintain a fixed or stationary location on a support surface, or may be provided with attachment devices/assemblies that are configured to move along the support surface. FIG. 14 illustrates a hanger mount that is rotatable about a fixed location attachment member according to an example embodiment of the present general inventive concept, and FIG. 15 illustrates a hanger mount that is rotatable about a movable attachment member according to another example embodiment of the present general inventive concept. The hanger mounts illustrated in FIGS. 14-15 each rotate around a spindle coupling the hanger mounts to the attachment portions, and are configured similarly to the example embodiment illustrated in FIGS. 3A-B, FIGS. 14-15 demonstrate how the same or similar hanger mounts can be suspended from a fixed location or movable attachment portion. As illustrated in FIGS. 14-15, a rotatable hanger mount includes a body portion 1210 from which side portions 1220 extend downwardly from substantially opposite sides thereof to define an upper open space 1230 therebetween, and flange portions 1240 extending inwardly from proximate the distal ends of the side portions 1220 to define a lower open space 1250 therebetween. The grooves 1260 formed on the flange portions 1240 are configured to receive side tabs of a workpiece hanger therein, and in this example embodiment are formed with an irregular surface to provide a close fit with portions of the front and/or back surfaces of the side tabs received in the grooves 1260. In these general features, the hanger mount 1200 is substantially similar to the example embodiments illustrated in FIGS. 3A-B and 11A-12B. In contrast to the fixed orientation hanger mount 1000 of FIGS. 11A-12B, however, the body portion 1210 of the hanger mount 1200 is configured to receive and at least partially surround a spindle member 1270 extending downward from an attachment portion (the fixed attachment portion 1280 in FIG. 14, the movable car configured attachment portion 1290 in FIG. 15). The hanger mount 1200 is configured to rotate about the stationary spindle member 1270, the spindle member 1270 being fixed to the respective attachment portion 1280 or 1290, and thus the hanger mount 1200 is rotatable about an axis extending down from the attachment portion. As with the example embodiment illustrated in FIGS. 3A-B, the spindle member 1270 may be configured with a hat portion 1300 proximate a lower end of the spindle member 1270, or a hat portion formed integrally with the spindle member 1270, that is configured with a plurality of detents 1310, which may be, for example, inverted V-shaped grooves, formed into the brim of the hat portion 1300. The detents 1310 may be spaced in a circumferential direction around the brim of the hat portion 1300 so as to correspond with distinct rotational positions of the hanger mount 1200 that may be chosen by a user such that the hanger mount 1200 does not move from that rotational orientation without a rotational force being applied to it. A biased member 1320 may rest matingly within one of the detents 1310 of the hat portion 1300 when the hanger mount 1200 is oriented at one of the selectable rotational positions. The biased member 1320 may be biased by a spring 1330 in contact with the biased member 1320 that is pressing the biased member upward towards the hat portion 1300. Rotation of the hanger mount 1200 about the spindle member 1270 in either a clockwise or counterclockwise direction rotates the biased member 1320 and spring 1330 inside the hanger mount 1200, applies a downward force on the spring 1330 and moves the biased member 1320 out of the detent 1310 in which the biased member 1320 was resting, until the biased member 1320 finds an adjacent detent 1310 within which it can rest. Although there may be various numbers of detents 1310 cut into the brim of the hat portion 1300 according to various example embodiments of the present general inventive concept, in an example embodiment the detents 1310 may be spaced in equal increments apart such that they provide equal access to surface features of the workpiece hung from the workpiece hanger suspended from the hanger mount 1200. The hanger mount 1200 may be coupled to the attachment portion 1280 of FIG. 14 so that the hanger mount 1200 may be pivoted about a fixed location, such as a work station, on which workpieces are individually suspended from the hanger mount 1200 for a process such as spraying. The hanger mount 1200 may be coupled to the attachment portion 1290 of FIG. 15 so that the hanger mount 1200 may be both rotatable and moved as a car member, via rotatable car wheels 1294, along a rail such as that illustrated in FIGS. 1-2.

Figure 16:
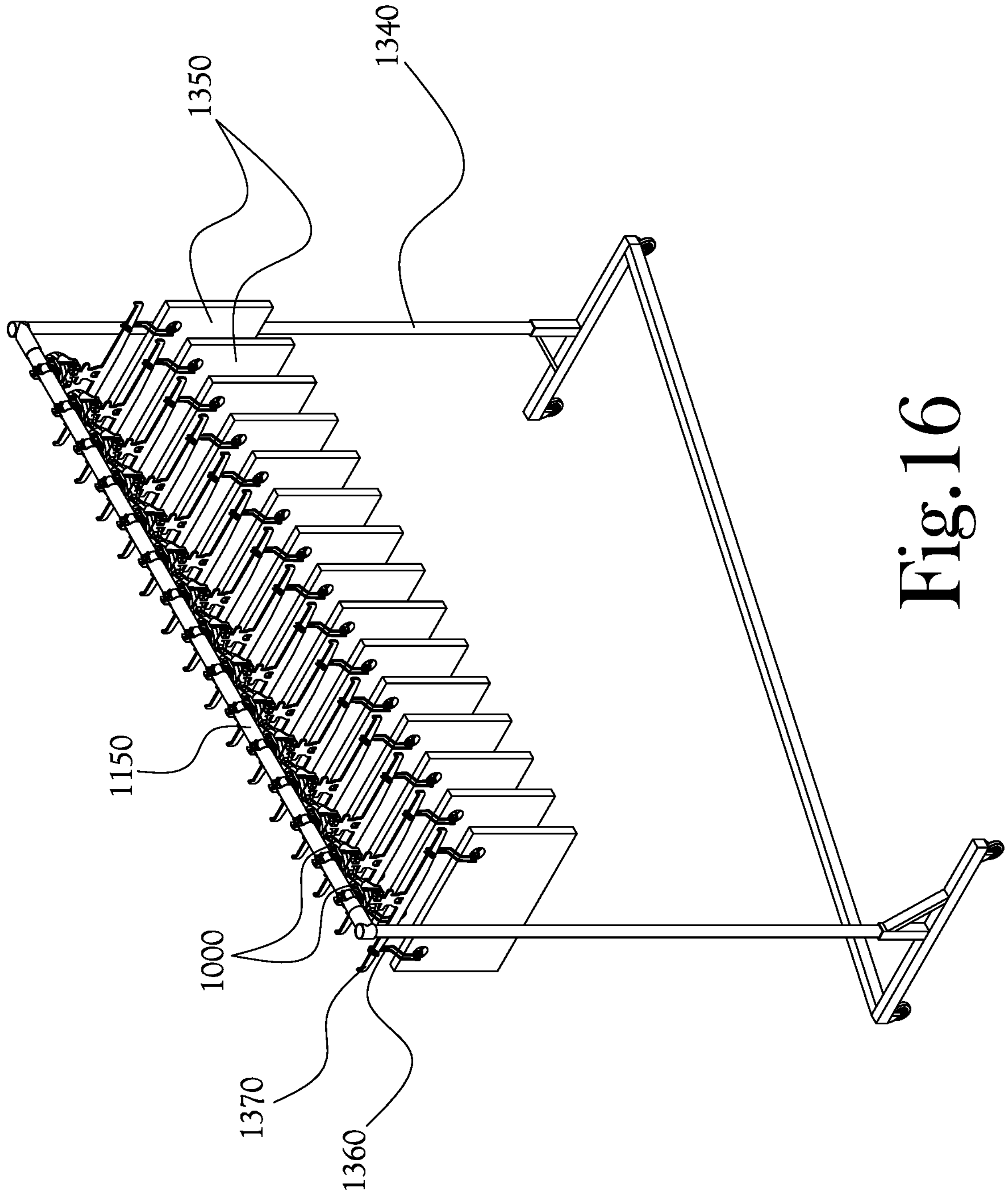
FIG. 16 illustrates a plurality of stationary hanger mounts coupled to a movable rack according to an example embodiment of the present general inventive concept.
Figure 17A:
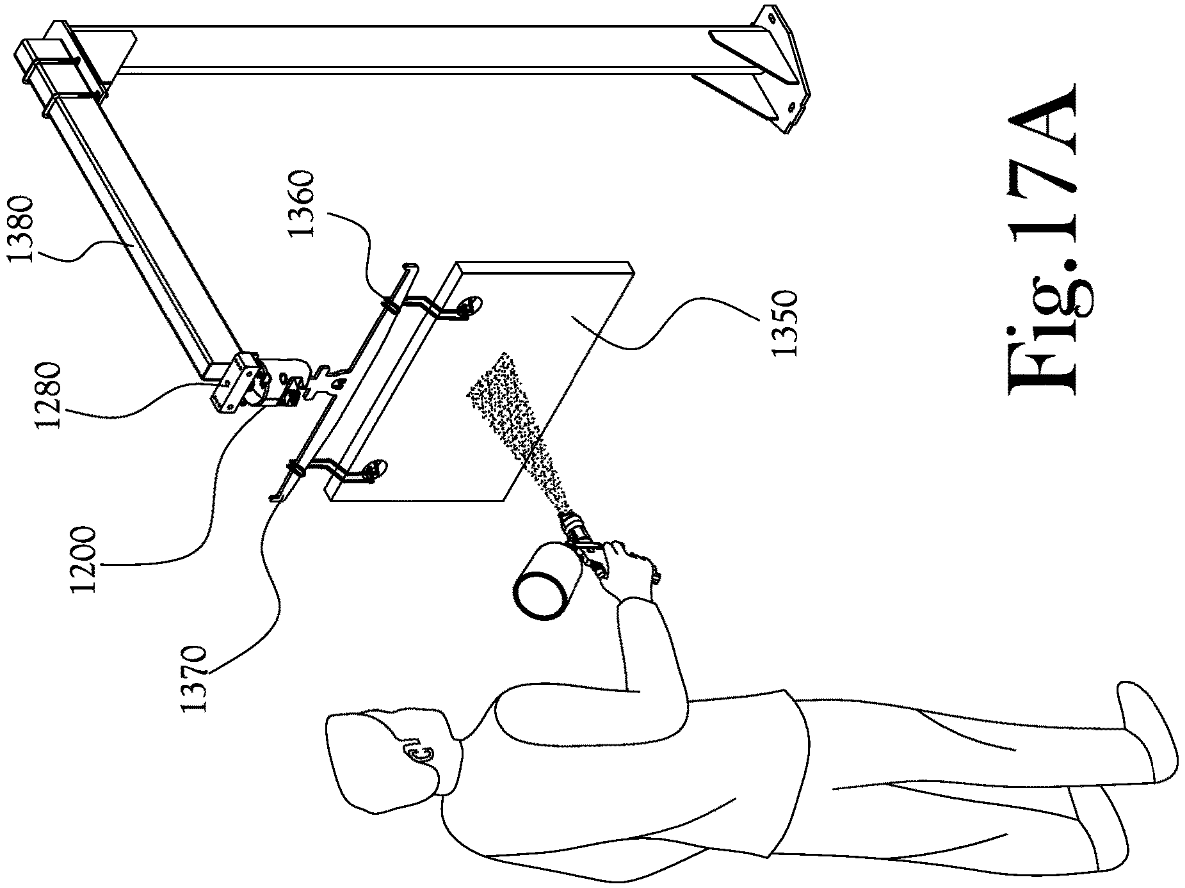
FIGS. 17A-B illustrate a method of using a rotational hanger mount at work station according to an example embodiment of the present general inventive concept.
Figure 17B:
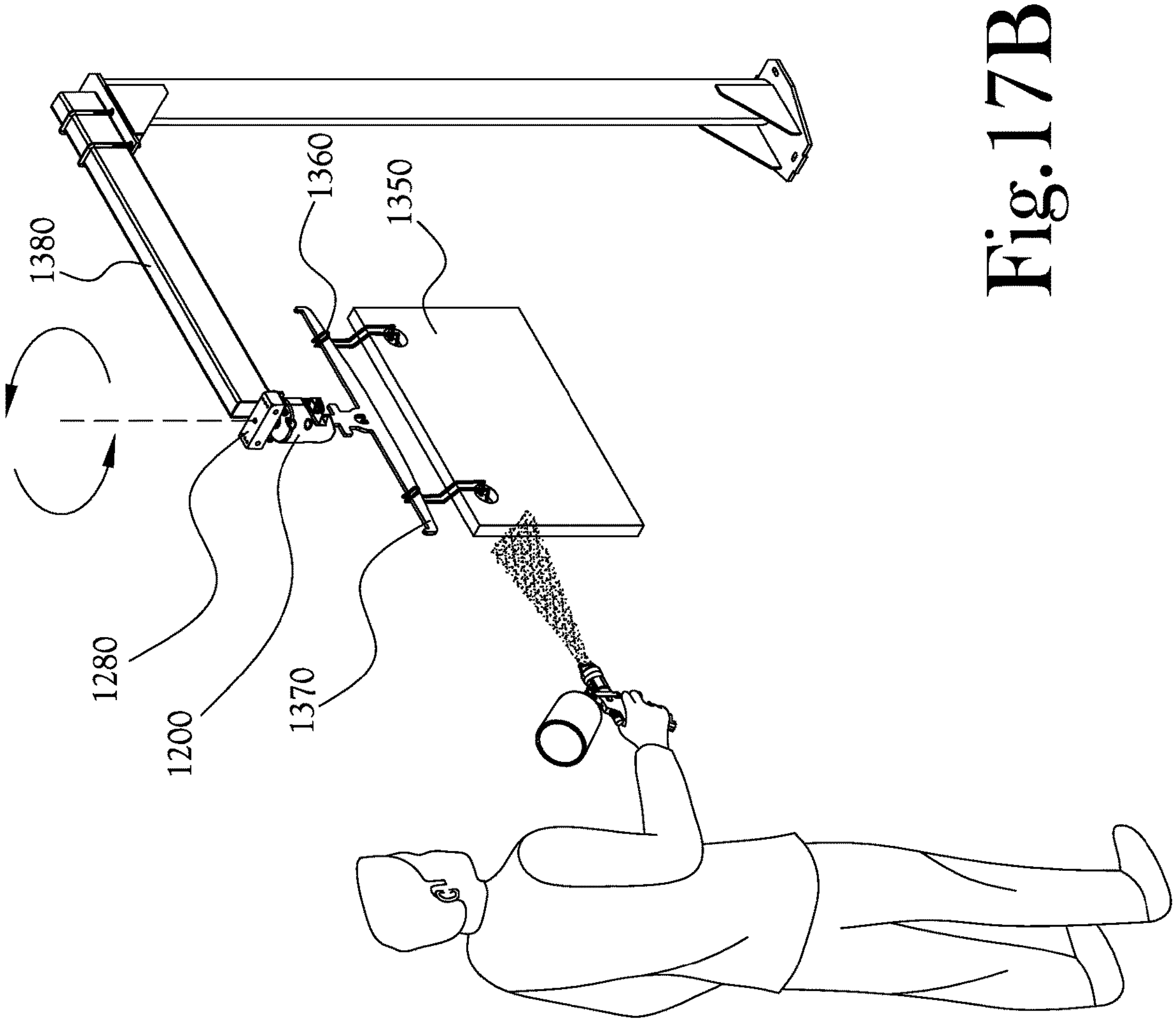

FIG. 16 illustrates a plurality of fixed position hanger mounts coupled to a movable rack according to an example embodiment of the present general inventive concept. In this illustrated embodiment, a plurality of the hanger mounts 1000 of FIGS. 11A-12B have been coupled to the bar 1150 of a rolling rack so that a plurality of workpieces can be moved from one work station to another. The workpieces in this example are panels 1350 that are suspended from offset hangers 1360 hanging from a long hanger type workpiece hanger 1370 that allows the center of mass of the panels 1350 to be substantially centered on a rotational axis of a rotation hanger mount 1200 that they may be transferred to at various work stations such as those illustrated in FIGS. 17A-B. The rotational axis of the rotation hanger mount 1200 may be substantially centered on the longitudinal axis passing down through the upper and lower open spaces 1030,1050 of the non-rotational hanger mount 1000. FIGS. 17A-B illustrate a method of using a rotational hanger mount at work station according to an example embodiment of the present general inventive concept. In FIG. 17A a user has removed the workpiece hanger 1370 supporting one of the panels 1350 from the hanger mount 1000 rolling rack 1340 and mounted that workpiece hanger to the rotational hanger mount 1200 that is coupled, via the attachment portion 1280, to a fixed work station support member 1380. The support member 1380 of this example embodiment is a floor stand, but could be ceiling or otherwise mounted in other various example embodiments. The hanger mount 1200 is configured to be biased to rest at one of four evenly distributed positions around the axis of rotation when rotational force is not applied to the hanger mount 1200, and a one of those positions is illustrated in FIG. 17A. After the user/worker has completed a spray operation on a first surface as shown in FIG. 17A, the user can rotate the hanger mount 1200, by applying force to the hanger mount 1200, workpiece hanger 1370, offset hangers 1360, or the panel 1350 itself to move the panel to the next rotational position configured in the biased rotational hanger mount 1200. The next position is shown in FIG. 17B. Thus, after completing the spraying operation on all four sides of the panel 1350, the user can move the workpiece hanger 1370, and therefore the panel 1350, back to the rolling rack 1340 or another similarly configured rack, upon which the spaced apart, non-rotational hanger mounts 1000 prevent the panels from contacting one another during transit of the rolling rack 1340.

Figure 19:
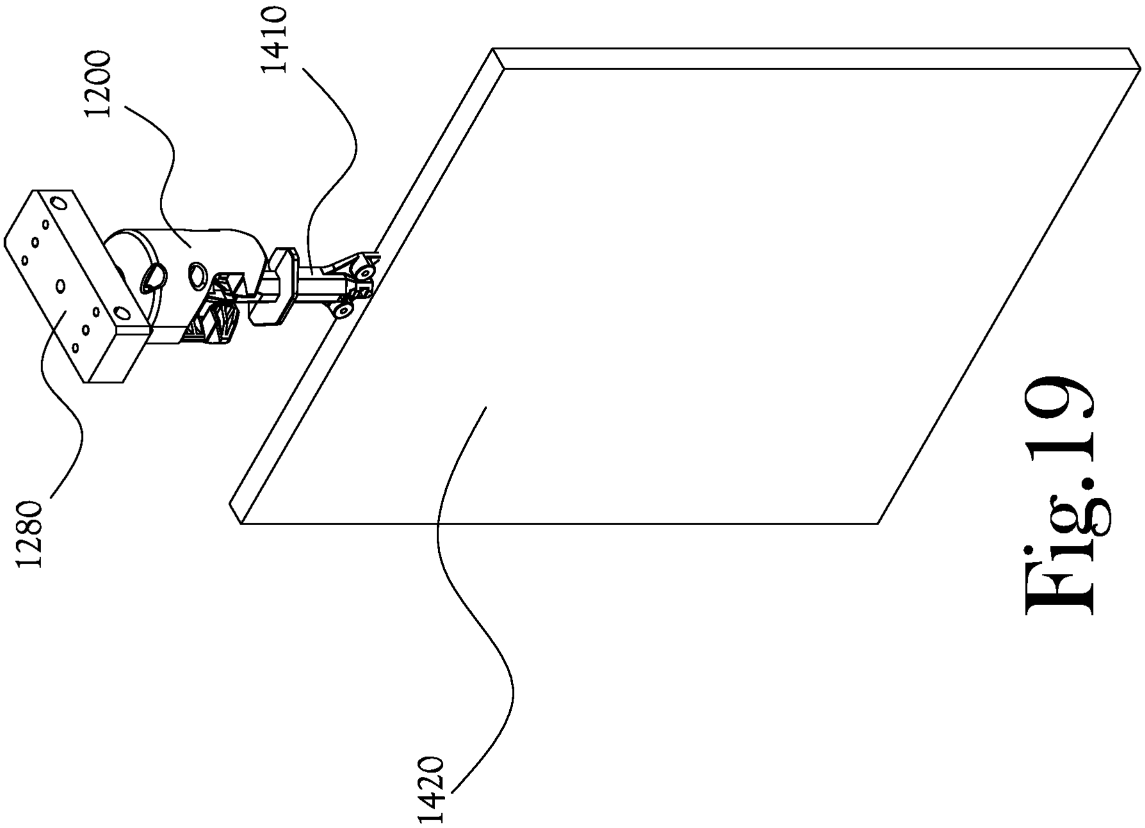
FIG. 19 illustrates a universal hanger and workpiece mounted to a rotational hanger mount according to an example embodiment of the present general inventive concept.
Figure 18:
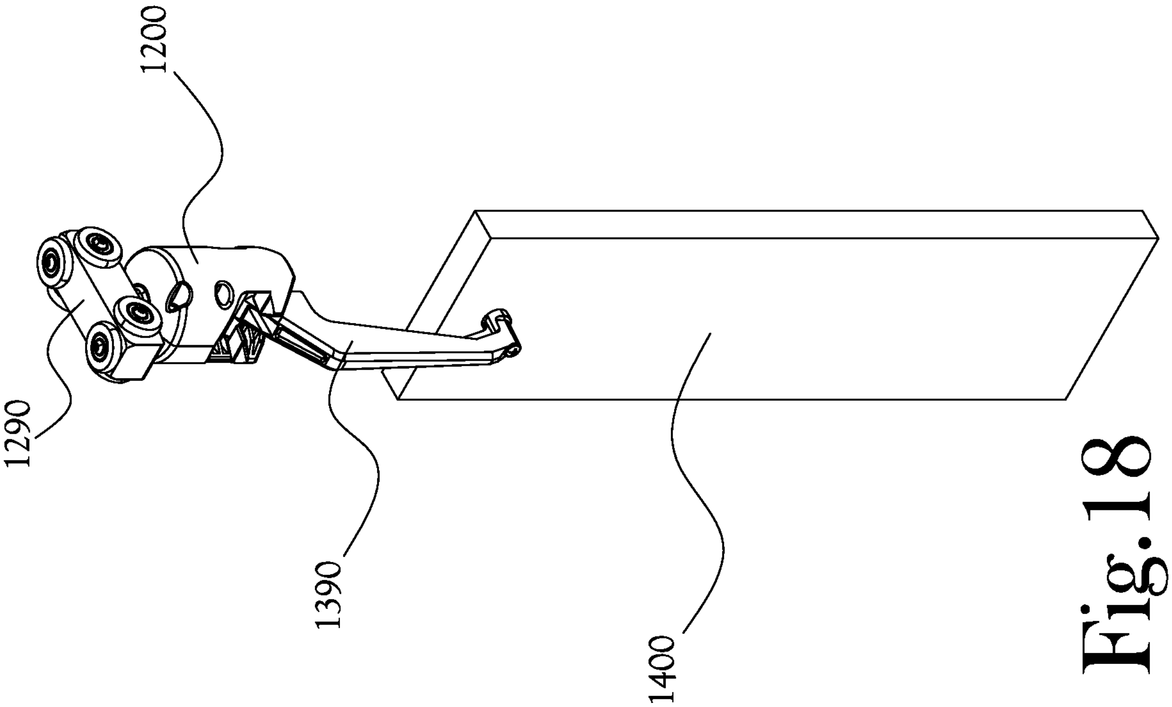
FIG. 18 illustrates an offset hanger and workpiece mounted to a rotational hanger mount according to an example embodiment of the present general inventive concept.

FIG. 18 illustrates an offset hanger and workpiece mounted to a rotational hanger mount according to an example embodiment of the present general inventive concept. In this example embodiment, a workpiece panel 1400 is attached to an offset hanger 1390 that is mounted to the rotatable hanger mount 1200, which is coupled to the rolling car attachment portion 1290 as illustrated in FIG. 15. Since the offset hanger 1390 bends out from the upper T-shaped mounting portion before extending downward and then back toward the rotational axis of the hanger mount 1200 to connect to the panel 1400, the center of mass of the panel is able to be substantially centered on the rotational axis of the hanger mount 1200, even though the panel 1400 is attached to the offset hanger 1390 through a side surface of the panel 1400. Thus, a user can rotate the panel 1400 between various positions without the panel rotating at on offset distance about the rotational axis of the hanger mount 1200. FIG. 19 illustrates a universal hanger and workpiece mounted to a rotational hanger mount according to an example embodiment of the present general inventive concept. In this example embodiment a panel 1420 is attached to a universal hanger 1410 via a screw that is configured to be substantially coaxial with the rotational axis of the rotatable hanger mount 1200. The universal hanger 1410 is mounted to the rotatable hanger mount 1200, which is coupled to a stationary or fixed point attachment portion 1280 as illustrated in FIG. 14. Thus, the center of mass of the panel 1420 is substantially centered on the rotational axis of the rotatable hanger mount 1200.

Various example embodiments of the present general inventive concept may provide a system for retaining and maneuvering workpiece items to be spray-coated, the system including a workpiece hanger mount including a body portion, two side portions extending downward from the body portion to form an upper open space therebetween, two flange portions extending inwardly respectively from proximate distal ends of the two side portions to form a lower open space therebetween, and a groove formed in an upper surface of each of the flange portions, and one or more workpiece hangers including a lower portion configured to be attached to a workpiece, and an upper portion having two side tabs extending away from one another and configured to be selectively received in the respective grooves formed in the flange portions of the hanger mount, wherein a workpiece is selectively hung from the system by attaching the workpiece to one of the workpiece hangers and mounting the workpiece hanger in the hanger mount. The upper portion of each of the one or more workpiece hangers may be configured in a T-shape with the two side tabs extending away from an upper end of an elongated member. A portion of the elongated member below the side tabs may be configured to be selectively passed through the lower open space of the hanger mount. Each of the side tabs may have lower surfaces configured to register with bottoms of the respective grooves of the hanger mount. Each of the side tabs may have side surfaces configured to register with sides of the respective grooves of the hanger mount. Each of the side tabs may have end surfaces configured to register with ends of the respective grooves of the hanger mount. Each of the side tabs may have lower surfaces configured to register with bottoms of the respective grooves of the hanger mount, side surfaces configured to register with sides of the respective grooves of the hanger mount, and end surfaces configured to register with ends of the respective grooves of the hanger mount, such that the workpiece hanger is substantially stable in three axes when suspended from the hanger mount. The system may further include an attachment portion connected to the body portion of the hanger mount, the attachment portion being configured to couple the hanger mount to a support surface. The body portion of the hanger mount may be connected to the attachment portion so as to maintain the hanger mount in a fixed orientation relative to the attachment assembly. The body portion of the hanger mount may be connected to the attachment portion so as to be rotatable relative to the attachment portion. The hanger mount may be biased to rest at a plurality of predetermined rotational positions when rotational force is not applied to the hanger mount. The hanger mount may be biased to rest at four selectable rotational positions when rotational force is not applied to the hanger mount, each of the four rotational positions being 90 degrees from any adjacent rotational position. The system may further include a spindle configured to couple the body portion to the attachment portion such that the hanger mount is rotatable about the spindle and relative to the attachment portion. The system may further include a hat portion provided to the spindle and configured with a plurality of detents formed to interact with the hanger mount such that the hanger mount is biased to rest at a plurality of selectable predetermined rotational positions when rotational force is not applied to the hanger mount. The hanger mount may further include a spring-loaded member to engage one of the detents to maintain the hanger mount at a rotational position at which the spring-loaded member engages the one of the detents. Rotation of the hanger mount about the spindle and hat portion may force the spring-loaded member to be moved out of the detent engaged by the spring-loaded member, and to engage a detent adjacent to the previously engaged detent to maintain the hanger mount at another rotational position corresponding to the newly engaged detent. The spring-loaded member may be a spring-loaded pin or a spring plate. The system may further include a plurality of wheels provided to the attachment portion such that the attachment portion can be moved along the support surface. The one or more workpiece hangers may be configured to be attached to workpieces such that a center of mass of the respective workpieces is substantially centered on a rotational axis of the hanger mount. The one or more workpieces may include a drawer front holder, a shelf holder, a hinge hole mount, a universal hanger, or any combination thereof. A plurality of grooves may be formed in an upper surface of each of the flange portions, and a corresponding plurality of tabs may be formed in the upper portion of the one or more workpiece hangers, the plurality of tabs being configured to fit matingly in the respective plurality of grooves.

Various example embodiments of the present general inventive concept may provide a system for retaining and maneuvering workpiece items to be spray-coated, the system including a workpiece hanger mount including a body portion configured with at least one groove portion, and one or more workpiece hangers including a lower portion configured to be attached to a workpiece, and an upper portion having at least one tab member configured to be selectively received in the at least one groove portion of the hanger mount, wherein a workpiece is selectively hung from the system by attaching the workpiece to one of the workpiece hangers and mounting the workpiece hanger in the hanger mount, and wherein the at least one tab member of the one or more workpiece hangers is configured to fit matingly within the at least one groove portion of the workpiece hanger mount. The at least one groove portion of the workpiece hanger mount may be configured with at least a partially open upper surface such that the at least one tab member enters the at least one groove portion from above, and rests therein at least partially due to gravity, when the corresponding workpiece hanger is mounted to the workpiece hanger mount.

Various example embodiments of the present general inventive concept may provide a system for retaining and maneuvering workpiece items to be spray-coated, the system including a workpiece hanger mount including a body portion configured with at least one groove portion having at least a first mating surface, and one or more workpiece hangers including a lower portion configured to be attached to a workpiece, and an upper portion having at least one tab member configured to be selectively received in the at least one groove portion of the hanger mount, the at least one tab member having at least a second mating surface such that when a workpiece is attached to the lower portion of the one or more workpiece hangers and the at least one tab member is received in the at least one groove portion, the at least one first and second mating surfaces mate with one another to securely hold the workpiece proximate a center of gravity of the workpiece so as to inhibit lateral movement of the workpiece relative to the workpiece hanger mount.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While example embodiments have been illustrated and described, it will be understood that the present general inventive concept is not intended to limit the disclosure, but rather it is intended to cover all modifications and alternate devices and methods falling within the spirit and the scope of the invention as defined in the appended claims.

The invention claimed is:

1. A system for retaining and maneuvering workpiece items to be spray-coated, the system comprising:
- a workpiece hanger mount comprising:
  - a body portion,
  - two side portions extending downward from the body portion to form an upper open space therebetween,
  - two flange portions extending inwardly respectively from proximate distal ends of the two side portions to form a lower open space therebetween, and a groove formed in an upper surface of each of the flange portions; and
- one or more workpiece hangers comprising:
  - a lower portion configured to be attached to a workpiece, and
  - an upper portion having two side tabs extending away from one another and configured to be selectively received in the respective grooves formed in the flange portions of the hanger mount;
- wherein a workpiece is selectively hung from the system by attaching the workpiece to one of the workpiece hangers and mounting the workpiece hanger in the hanger mount.

2. The system of claim 1, wherein the upper portion of each of the one or more workpiece hangers is configured in a T-shape with the two side tabs extending away from an upper end of an elongated member.

3. The system of claim 2, wherein a portion of the elongated member below the side tabs is configured to be selectively passed through the lower open space of the hanger mount.

4. The system of claim 2, wherein each of the side tabs have lower surfaces configured to register with bottoms of the respective grooves of the hanger mount.

5. The system of claim 2, wherein each of the side tabs have side surfaces configured to register with sides of the respective grooves of the hanger mount.

6. The system of claim 2, wherein each of the side tabs have end surfaces configured to register with ends of the respective grooves of the hanger mount.

7. The system of claim 2, wherein each of the side tabs have lower surfaces configured to register with bottoms of the respective grooves of the hanger mount, side surfaces configured to register with sides of the respective grooves of the hanger mount, and end surfaces configured to register with ends of the respective grooves of the hanger mount, such that the workpiece hanger is substantially stable in three axes when suspended from the hanger mount.

8. The system of claim 1, further comprising an attachment portion connected to the body portion of the hanger mount, the attachment portion configured to couple the hanger mount to a support surface.

9. The system of claim 8, wherein the body portion of the hanger mount is connected to the attachment portion so as to maintain the hanger mount in a fixed orientation relative to the attachment assembly.

10. The system of claim 8, wherein the body portion of the hanger mount is connected to the attachment portion so as to be rotatable relative to the attachment portion.

11. The system of claim 10, wherein the hanger mount is biased to rest at a plurality of predetermined rotational positions when rotational force is not applied to the hanger mount.

12. The system of claim 10, wherein the hanger mount is biased to rest at four selectable rotational positions when rotational force is not applied to the hanger mount, each of the four rotational positions being 90 degrees from any adjacent rotational position.

13. The system of claim 8, further comprising a spindle configured to couple the body portion to the attachment portion such that the hanger mount is rotatable about the spindle and relative to the attachment portion.

14. The system of claim 13, further comprising a hat portion provided to the spindle and configured with a plurality of detents formed to interact with the hanger mount such that the hanger mount is biased to rest at a plurality of selectable predetermined rotational positions when rotational force is not applied to the hanger mount.

15. The system of claim 14, wherein the hanger mount further comprises a spring-loaded member to engage one of the detents to maintain the hanger mount at a rotational position at which the spring-loaded member engages the one of the detents.

16. The system of claim 15, wherein rotation of the hanger mount about the spindle and hat portion forces the spring-loaded member to be moved out of the detent engaged by the spring-loaded member, and to engage a detent adjacent to the previously engaged detent to maintain the hanger mount at another rotational position corresponding to the newly engaged detent.

17. The system of claim 15, wherein the spring-loaded member is a spring-loaded pin or a spring plate.

18. The system of claim 8, further comprising a plurality of wheels provided to the attachment portion such that the attachment portion can be moved along the support surface.

19. The system of claim 10, wherein the one or more workpiece hangers are configured to be attached to workpieces such that a center of mass of the respective workpieces is substantially centered on a rotational axis of the hanger mount.

20. The system of claim 1, wherein the one or more workpieces comprise a drawer front holder, a shelf holder, a hinge hole mount, a universal hanger, or any combination thereof.

21. The system of claim 1, wherein a plurality of grooves are formed in an upper surface of each of the flange portions, and a corresponding plurality of tabs are formed in the upper portion of the one or more workpiece hangers, the plurality of tabs being configured to fit matingly in the respective plurality of grooves.

* * * * *